(12) United States Patent
Mahawili

(10) Patent No.: US 8,178,987 B2
(45) Date of Patent: May 15, 2012

(54) WIND TURBINE

(75) Inventor: Imad Mahawili, Grand Haven, MI (US)

(73) Assignee: E-Net, LLC, Grand Haven, MI (US)

( * ) Notice: Subject to any disclaimer, the term of this patent is extended or adjusted under 35 U.S.C. 154(b) by 83 days.

(21) Appl. No.: 12/714,913

(22) Filed: Mar. 1, 2010

(65) Prior Publication Data

US 2010/0295317 A1  Nov. 25, 2010

Related U.S. Application Data

(60) Provisional application No. 61/179,968, filed on May 20, 2009.

(51) Int. Cl.
  *F03D 9/00* (2006.01)
  *F03D 11/00* (2006.01)
(52) U.S. Cl. ............................. 290/44; 290/55; 415/4.5
(58) Field of Classification Search .................. 290/43, 290/44, 54, 55; 415/4.5, 4
  See application file for complete search history.

(56) References Cited

U.S. PATENT DOCUMENTS

| | | | |
|---|---|---|---|
| 4,414,814 A | 11/1983 | White | |
| 4,720,640 A * | 1/1988 | Anderson et al. | 290/43 |
| 5,252,029 A | 10/1993 | Barnes | |
| 5,315,159 A | 5/1994 | Gribnau | |
| 5,517,464 A | 5/1996 | Lerner et al. | |
| 5,664,418 A | 9/1997 | Walters | |
| 6,064,123 A * | 5/2000 | Gislason | 290/55 |
| 6,285,090 B1 | 9/2001 | Brutsaert et al. | |
| 6,664,655 B2 | 12/2003 | Vann | |
| 6,700,216 B1 | 3/2004 | Vann | |
| 6,952,058 B2 * | 10/2005 | McCoin | 290/44 |
| 7,042,109 B2 | 5/2006 | Gabrys | |
| 7,116,006 B2 * | 10/2006 | McCoin | 290/54 |
| 7,279,803 B1 * | 10/2007 | Bosley | 290/54 |
| 7,358,624 B2 * | 4/2008 | Bacon | 290/55 |
| 7,417,334 B2 * | 8/2008 | Uchiyama | 290/55 |
| 7,471,009 B2 | 12/2008 | Davis et al. | |
| 7,550,864 B2 | 6/2009 | Anderson et al. | |

(Continued)

FOREIGN PATENT DOCUMENTS

CA  2690228  12/2008

(Continued)

OTHER PUBLICATIONS

PCT International Search Report dated May 19, 2010, for corresponding PCT Application No. PCT/US2010/022871.

(Continued)

*Primary Examiner* — Nicholas Ponomarenko
(74) *Attorney, Agent, or Firm* — Warner Norcross & Judd LLP

(57) ABSTRACT

A wind turbine includes a rotary shaft having an axis of rotation, a plurality of turbine blades supported for rotary motion by the shaft, and a plurality of magnets supported by and spaced outwardly from the rotary shaft. The blades are mounted to the shaft by a mount that is radially inward of the magnets wherein the magnets have an annular velocity of at least the annular velocity of the blades. The turbine also includes a conductive coil, which is located outwardly from the magnets and the blades, wherein the coil surrounds the magnets and the blades and which is sufficiently close to the magnets such that rotary movement of the magnets induces current flow in the coil.

21 Claims, 39 Drawing Sheets

U.S. PATENT DOCUMENTS

| | | | | |
|---|---|---|---|---|
| 7,582,982 B1* | 9/2009 | Deal | | 290/55 |
| 7,605,486 B2* | 10/2009 | Bridwell | | 290/43 |
| 7,825,532 B1* | 11/2010 | Barber | | 290/55 |
| 7,927,065 B2* | 4/2011 | Moehring | | 415/4.3 |
| 8,049,351 B2* | 11/2011 | Mahawili | | 290/44 |
| 8,102,073 B2* | 1/2012 | Morrison | | 290/55 |
| 8,109,727 B2* | 2/2012 | Barber | | 416/132 B |
| 2004/0052640 A1 | 3/2004 | Khan | | |
| 2007/0013194 A1 | 1/2007 | Calley | | |
| 2009/0322094 A1* | 12/2009 | Mahawili | | 290/55 |
| 2010/0194116 A1* | 8/2010 | Mahawili | | 290/55 |
| 2010/0295305 A1* | 11/2010 | Mahawili | | 290/44 |
| 2010/0295317 A1 | 11/2010 | Mahawili | | |

FOREIGN PATENT DOCUMENTS

| | | |
|---|---|---|
| EP | 2187045 | 5/2010 |
| JP | 10077996 | 3/1998 |
| JP | 2000-506580 | 5/2000 |
| JP | 2006109549 | 4/2006 |
| KR | 10-2004-0103814 | 12/2004 |
| KR | 1020050021214 | 3/2005 |
| KR | 10-2006-0091367 | 8/2006 |
| KR | 10-2008-0072825 | 8/2008 |

OTHER PUBLICATIONS

PCT Search Report and Written Opinion dated Dec. 17, 2010 for corresponding PCT Application No. PCT/US2010/035501.

* cited by examiner

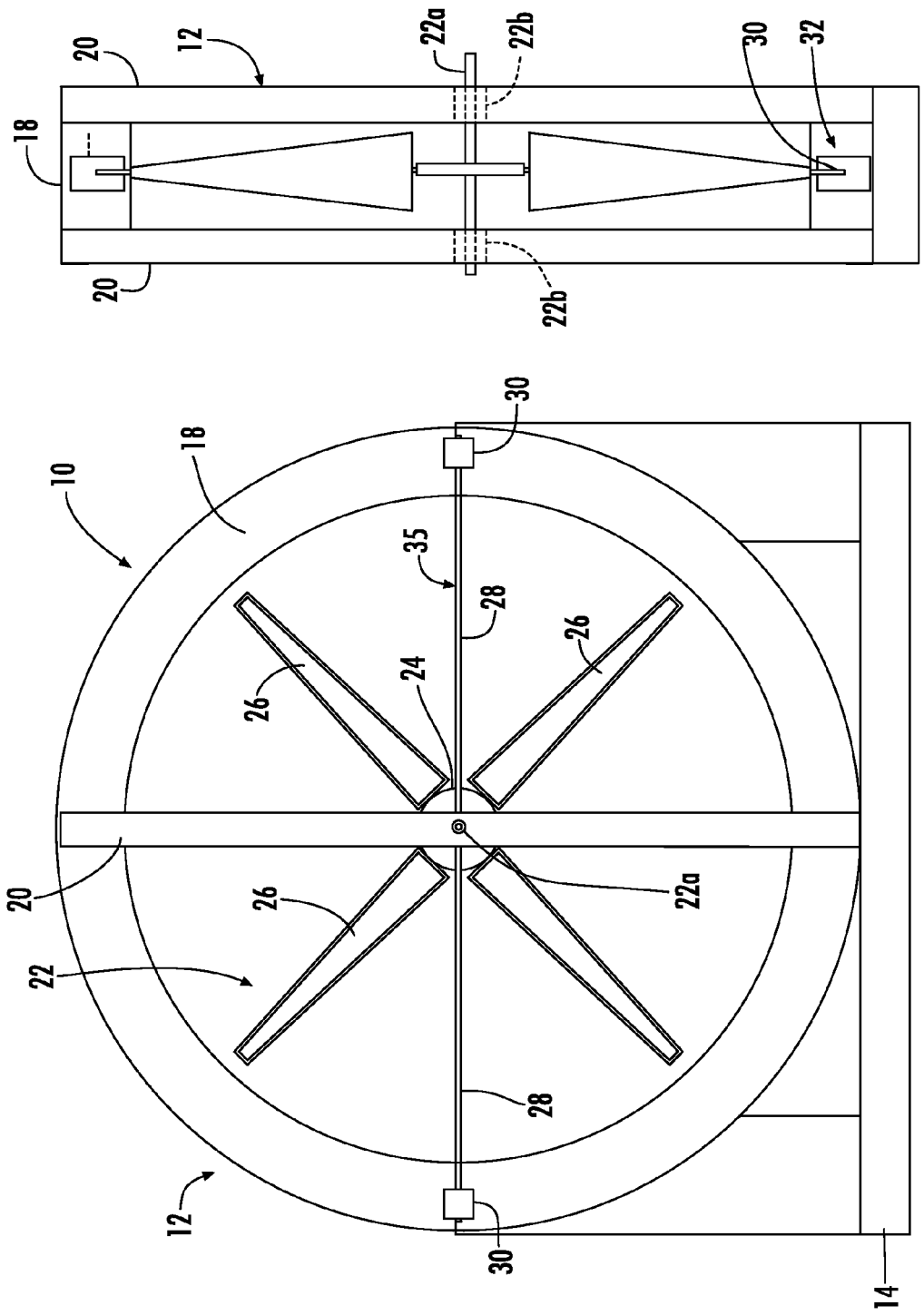

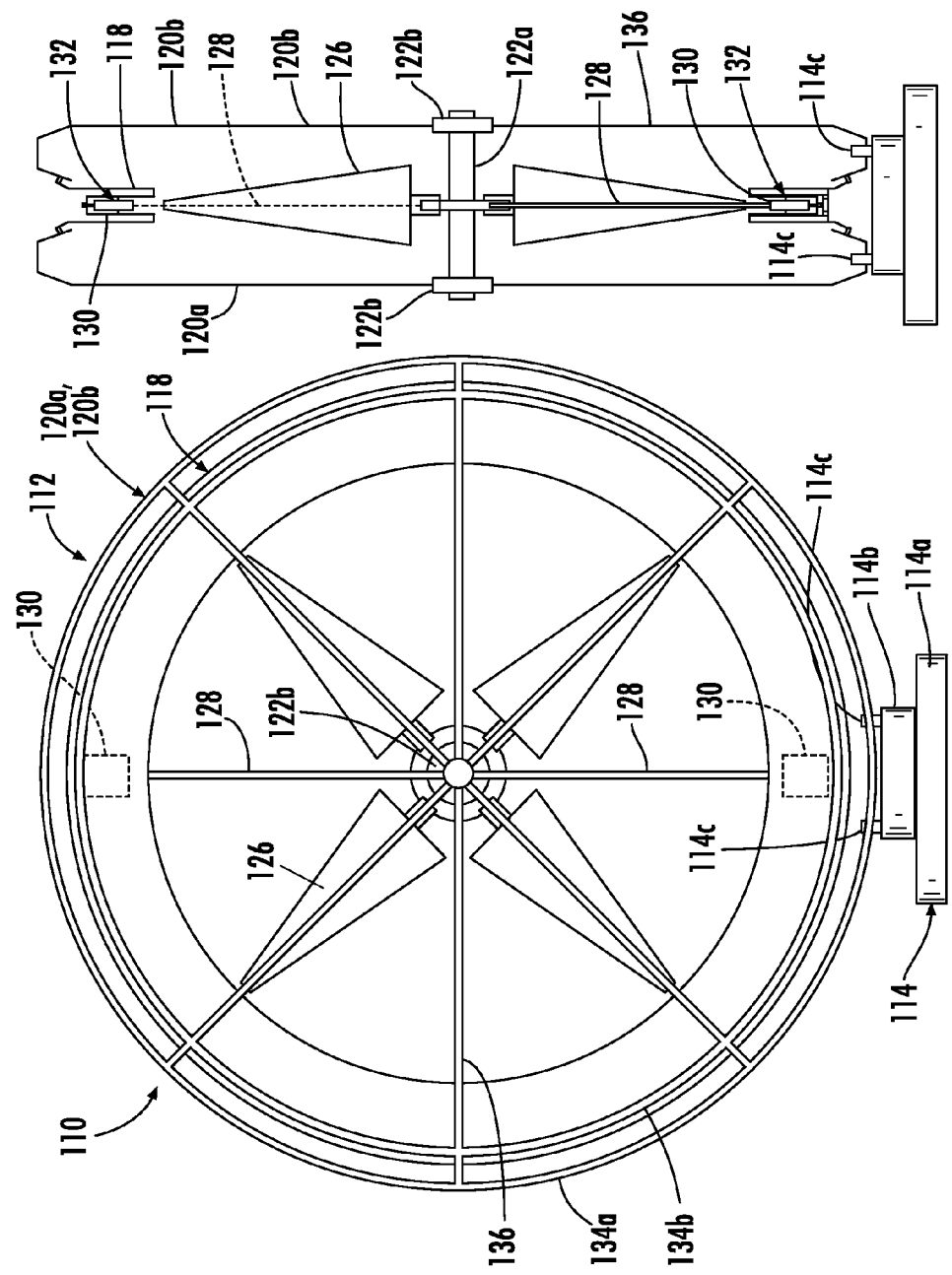

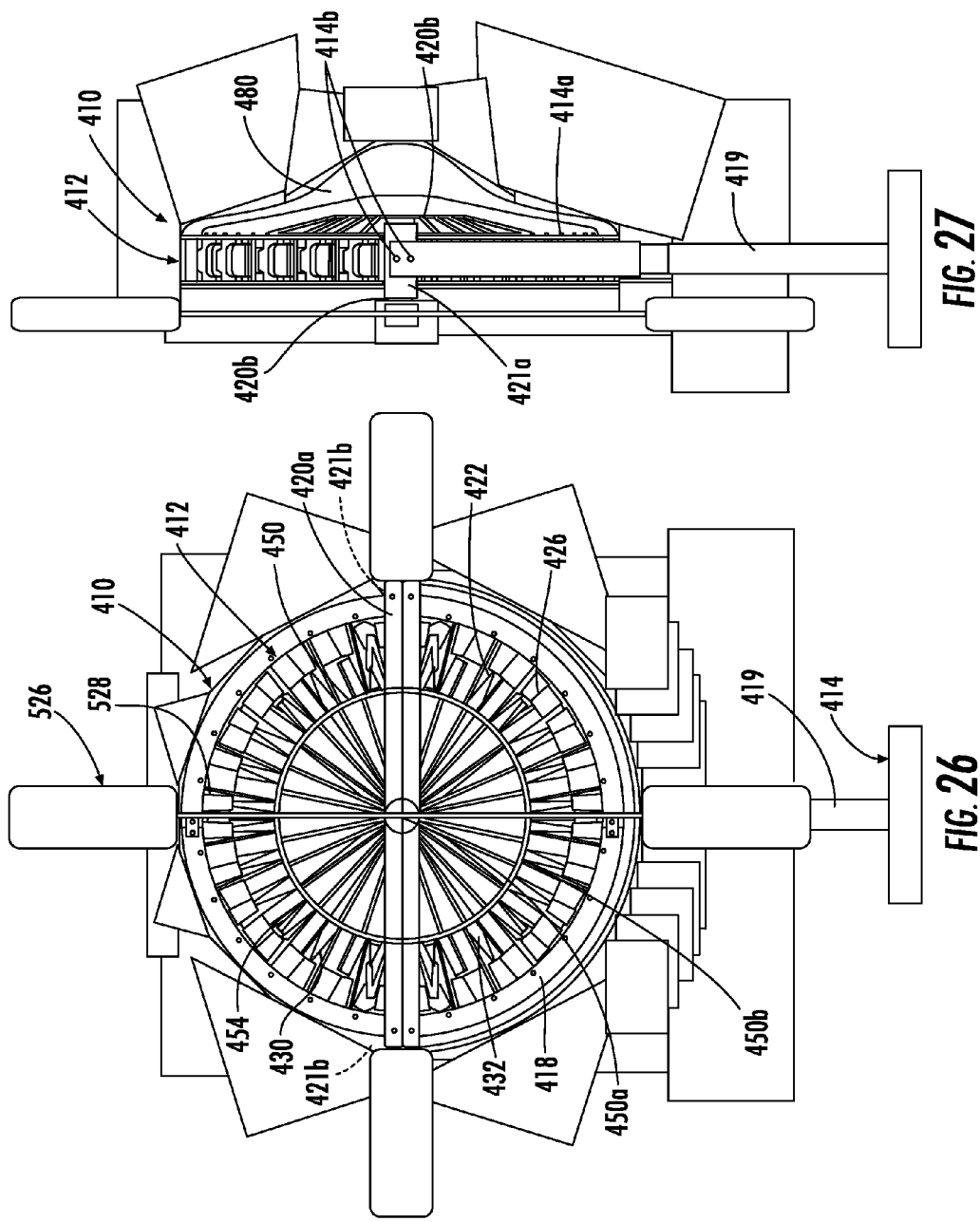

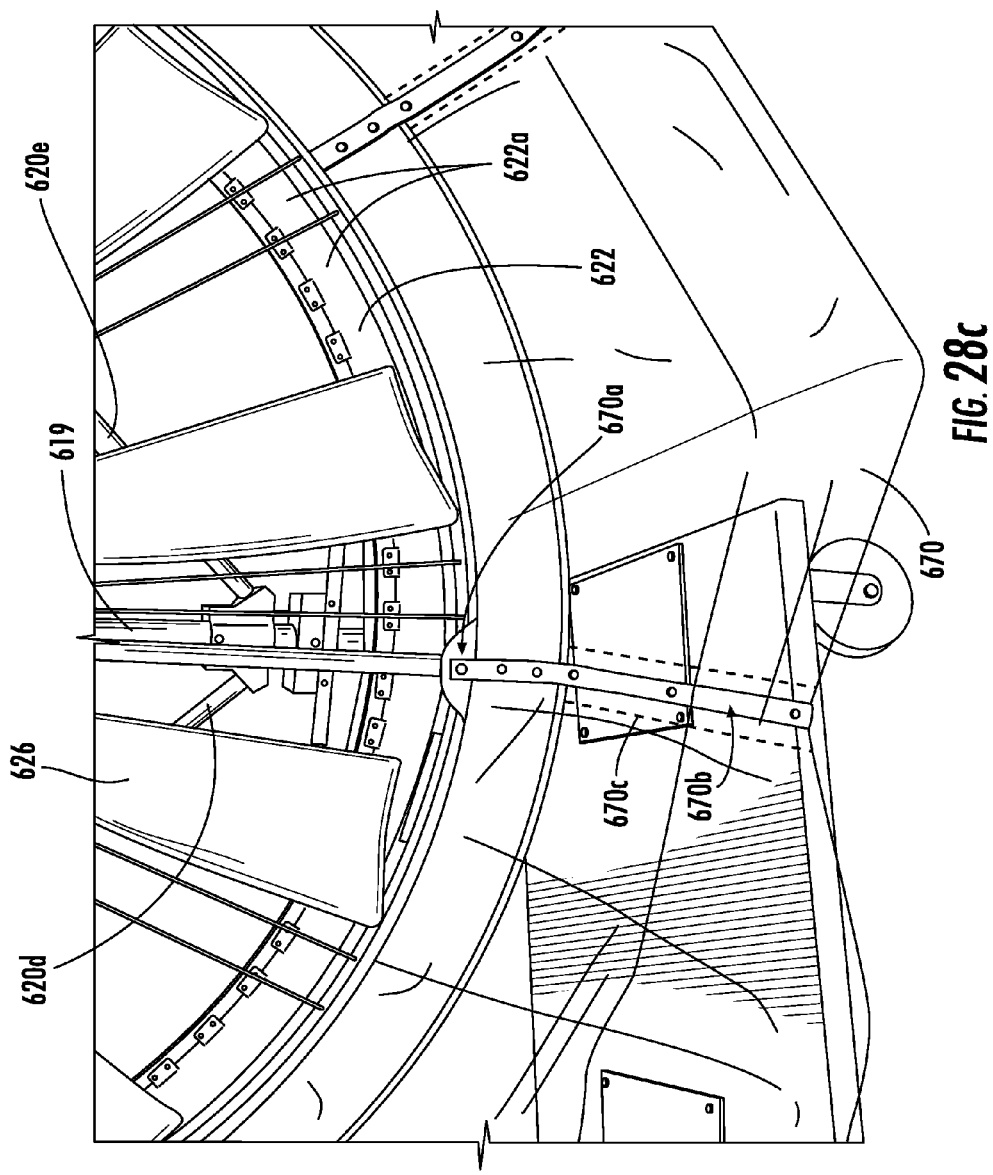

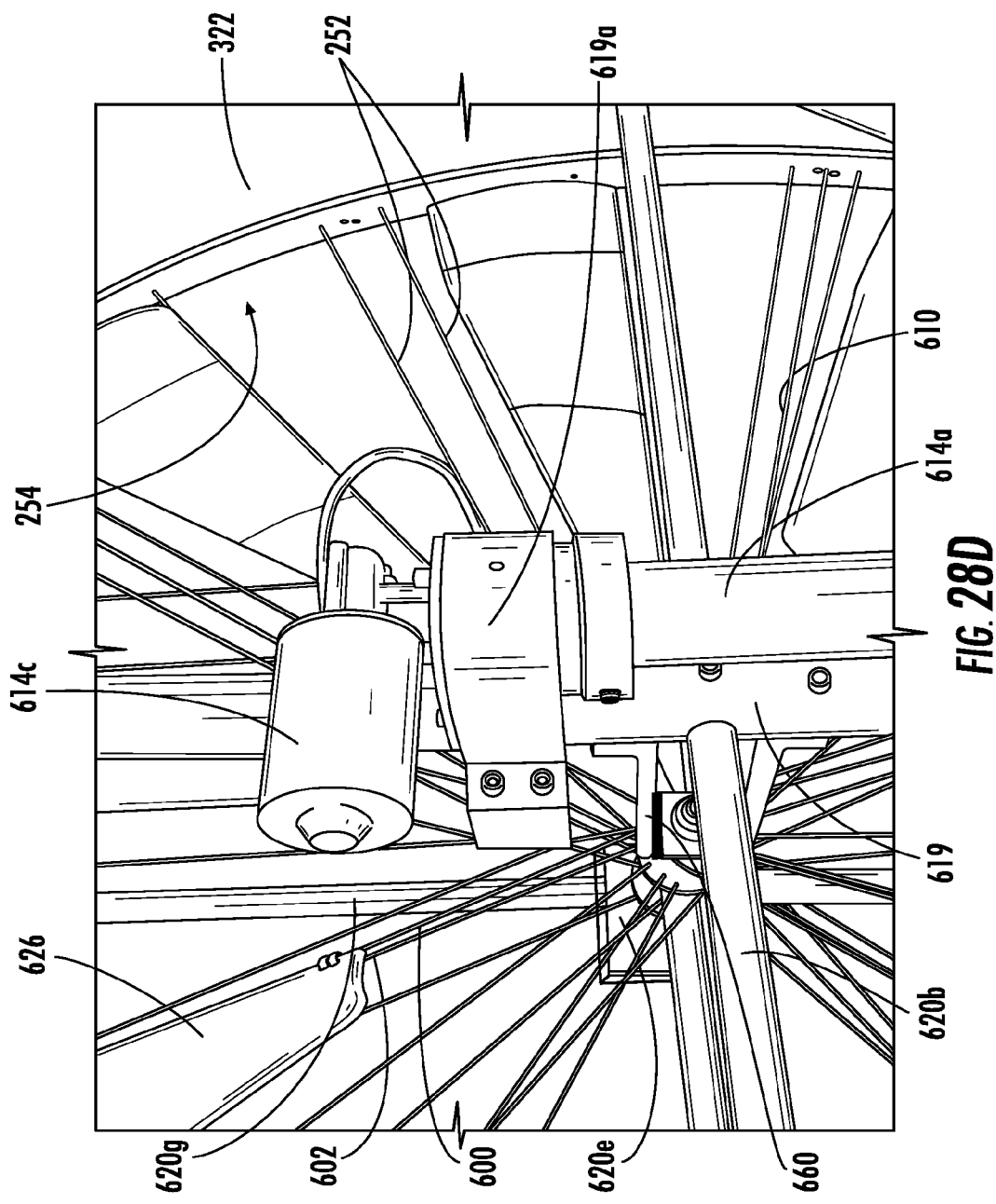

WIND TURBINE

This application claims the benefit of U.S. provisional application entitled WIND TURBINE, filed on May 20, 2009, Ser. No. 61/179,968, which is hereby incorporated by reference herein in its entirety, and is related to U.S. utility application entitled TURBINE ENERGY GENERATING SYSTEM, Ser. No. 12/138,818, filed Jun. 13, 2008, which is incorporated by reference herein in its entirety.

TECHNICAL FIELD AND BACKGROUND OF THE INVENTION

The present invention relates generally to a wind turbine and, more particularly, to a wind turbine that may operate at relatively low wind speeds while still generating electricity.

Conventional wind turbines typically start to operate when the wind speed is at or above 8 mph. This is due in part to the weight of the turbine blades and also in part to the friction in the gears between the turbine blade shaft and the generator. Therefore, current wind turbines do not typically harness energy from wind speeds of less 8 mph. Given that wind speeds below 8 mph represent a significant component of the overall wind speed spectrum in the U.S. and, elsewhere, the current wind turbines overlook a significant potential source of energy.

SUMMARY OF THE INVENTION

Accordingly, the present invention provides a wind turbine that can harness energy from low wind speeds to generate electricity. Further, the wind turbine can be assembled using relatively simple and inexpensive components and, further, can be constructed so that it can be portable and mounted on top of existing structures. Additionally, the wind turbine may be configured so that there is a significant reduction in noise generated when the wind turbine is operating, even under high wind speeds. Optionally, the wind turbine may be adapted to harness energy wind from beyond the outer periphery of the wind turbine blades to further enhance the efficiency of the wind turbine.

In one form of the invention, a wind turbine includes a rotary shaft having an axis of rotation, a plurality of turbine blades supported for rotary motion about the shaft, a plurality of magnets, which are supported by and spaced outwardly from the axis of rotation and outwardly from the rotary shaft, and a coil. The blades are mounted to the shaft by a mount that is radially inward of the magnets wherein the magnets have an angular velocity of at least the angular velocity of the blades. Further, the coil is located outwardly from the magnets, and optionally such that the coil surrounds the magnets.

In another form of the invention, a wind turbine includes a support and a plurality of turbine blades mounted for rotational movement relative to the support. Each of the blades has a proximal end inward of its distal end, with the distal end of each blade having a greater width than its inward proximal ends. Further, each blade has an asymmetrical cross-section which varies along its length.

In yet another form of the invention, a wind turbine includes a support and a plurality of turbine blades mounted for rotational movement relative to the support. Each of the blades has a proximal end inward of its distal end, with the distal end of each blade having a greater width than its inward proximal ends. Further, each blade has an attack angle that varies along its length, with the greatest attack angle at its distal end and the smallest attack angle at its proximal end.

According to yet another form of the invention, a wind turbine includes a support and a plurality of turbine blades rotatably mounted relative to the support. Each of the blades is formed from a flexible membrane. Optionally, blades on opposed sides of the support are tied together so that the radial forces acting on the opposed blades are balanced. Additionally, the blades may be tied together by an elastic member or a spring so that the blades may move away from the support under high wind conditions. Further, the blades may be configured to assume a more compact configuration, e.g. fold or compress, to reduce the surface area of the blade and hence the wind turbine's solidity.

In another form of the invention, a wind turbine includes a turbine wheel with a plurality of wind turbine blades, which is mounted for rotation in a plane, and at least one magnet extending outwardly from the turbine wheel in a direction angled with respect to the plane of rotation of the wind turbine wheel.

According to yet another form of the invention, a wind turbine includes a wind turbine wheel with an outer rim and a plurality of stators. The stators are generally aligned with at least a portion of the outer rim of the wheel, with at least a portion of the stators being radially inward of the outer perimeter of the outer rim.

In any of the above turbine, the turbine blades may be formed from a flexible membrane. For example, each blade may include a frame with the flexible membrane applied to the frame. Suitable frames include metal frames, such as aluminum frames, stainless steel frames, or the like. Alternately, the frame may be integrally formed with the membrane. The membrane can be formed from a flexible sheet of material, such as a fabric, including nylon or a KEVLAR®, or from a polymer, such as a plastic. The membrane is then mounted to the frame, for example, by welds, stitches, fasteners or the like.

Alternately, the blade may be molded from a moldable material, such as plastic, including a glass-filled nylon, polyethylene, a carbon fiber reinforced nylon, or KEVLAR®. For example when molded, the blade may be formed with an integral frame. For example, the blade may be molded with an outer perimeter rim and a thin web that extends between the outer rim, with the rim reinforcing the thin web. Further, the web may be reinforced by ribs that extend across the blade and optionally between two opposed sides of the rim. In this manner, a separate frame may not be needed.

In addition, the blades may be adapted to reduce the solidity of the turbine. For example, the turbine blades may be configured to assume a more compact configuration when the wind speed increases above a pre-determined wind speed. For example, the blades may be configured to form an opening in the blade that increases with an increase in wind speed above a predetermined wind speed. In one form the turbine blade is bifurcated with a bifurcated membrane, with one portion of the membrane being fixed and other separating from the fixed membrane in response to the wind speed exceeding the pre-determined wind speed.

In further aspects, the wind turbines may include a spoked wheel with a central hub and a plurality of spokes extending outwardly from the hub, which then support an annular ring or rim at their outer distal ends. The turbine blades are then mounted to the spokes. In this application, the magnets may be mounted to the annular rim of the wheel.

According to yet further aspects, the magnets may be mounted to the rim and extended from the rim along radii of the spoked wheel frame so that they lie in the same plane as the wheel. In another form, the magnets can be mounted to extend in a direction angled from the plane of rotation of the wheel. For example, the magnets may be mounted to the rim in a generally perpendicular orientation relative to the wheel so that they may extend in a horizontal direction around the axis of rotation of the wheel.

In other aspects, the stator coil or stator coils are configured with a generally U-shaped cross-section with a channel. Further, the magnets extend into the channel so that the coil straddles or surrounds the magnets on at least two sides. Additionally, the coil may be configured so that one leg of U-shaped cross-section of the coil generates current that is additive with the current generated in the second leg of the U-shaped cross-section of the coil. In this manner, when a magnet passes through the coil, the magnet generates double the electricity in the coil than if the coil was positioned at only one side of the magnet.

In a further aspect, the stator coil or stator coils are configured to extend at least partially around the circumferential path of the magnets. Optionally, the coil or coils may be extended around the full circumferential path of the magnets.

Accordingly, the present invention provides a wind turbine that can operate at low wind speeds, for example at wind speeds that are below 8 mph, less than 6 mph, less than 4 mph, and even below 2 mph, for example, at about 0.3 mph.

These and other objects, advantages, purposes, and features of the invention will become more apparent from the study of the following description taken in conjunction with the drawings.

BRIEF DESCRIPTION OF THE DRAWINGS

FIG. 1 is an elevation view of a wind turbine of the present invention;

FIG. 2 is a side end view of the turbine of FIG. 1;

FIG. 3 is an elevation view of another embodiment of the wind turbine of the present invention;

FIG. 4 is a side end view of the turbine of FIG. 3;

FIG. 17A is a plan view of the membrane support of FIG. 17;

FIG. 26 is an elevation view of another embodiment of the wind turbine of the present invention;

FIG. 27 is a side elevation view of the wind turbine of FIG. 26;

FIG. 28C is an enlarged fragmentary view of the wind turbine frame and mounting details for the wind concentrator;

FIG. 28D is an enlarged fragmentary view illustrating the turbine blades coupled together by a tie support and of the wind turbine frame mounting details;

DESCRIPTION OF THE PREFERRED EMBODIMENTS

Figure 5:
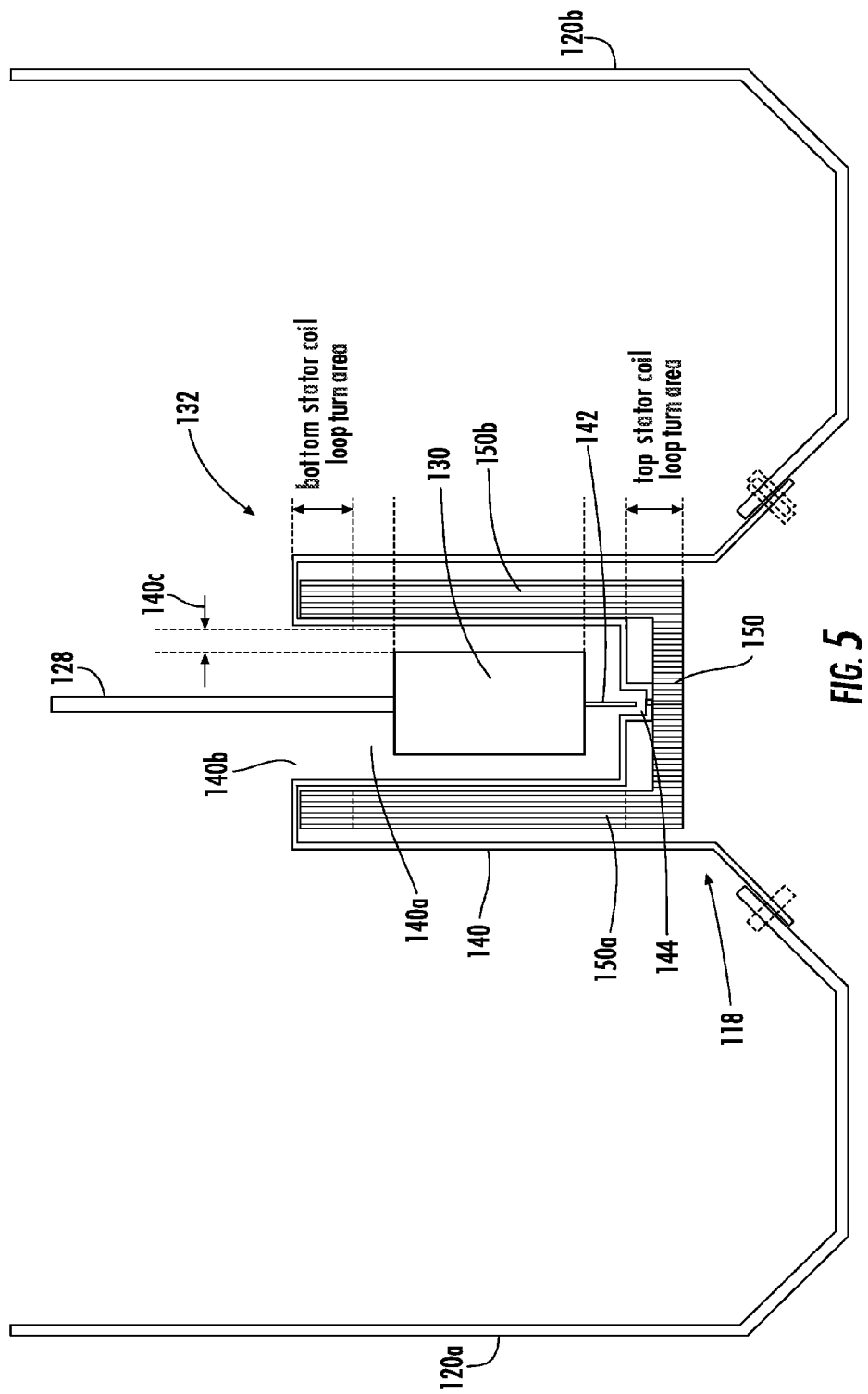
FIG. 5 is an enlarged view partial fragmentary view of the stator coil of FIG. 4 illustrating the magnet in the channel formed by the stator coil.

Referring to FIG. 1, the numeral 10 generally designates one embodiment of a wind turbine of the present invention. As will be more fully described below, wind turbine 10, as well as the other wind turbines described herein, may be configured to operate at low wind speeds. For example, the wind turbines can be configured to operate at wind speeds that are below 8 mph, below 6 mph, below 4 mph, below 2 mph, for example, and even as low as about 0.3 mph. As will be understood, this is partially achieved by forming the wind turbine from low weight wind turbine blades, and which therefore have low inertia, and also by providing a gearless turbine. Although a gearless turbine is initially described, it should be understood that a geared turbine may also be used. In addition, as noted in the referenced co-pending application, by mounting magnets at a location with increased angular speed for a given wind speed over conventional wind turbines, increased electrical generation can be realized for the same wind speed over a conventional wind turbine and, further, can be realized by harnessing magnetic flux from both sides of the magnet.

Referring to FIGS. 1 and 2, wind turbine 10 includes a frame 12 and a base 14. Frame 12 and base 14 may be formed from suitable metal components, including aluminum or stainless steel components, depending on their application. In some applications composite materials may also be suitable. Frame 12 includes an outer perimeter or annular member 18 and brace members 20, which are supported by the perimeter member 18 and provide a mounting surface for the wind turbine blade assembly 22. Turbine blade assembly 22 includes a hub 24, such as a central disk or plate, and a plurality of turbine blades 26 that are mounted to hub 24 and extend radially outwardly from hub 24, which is mounted to frame 12, namely at brace members 20, by a shaft 22a. Shaft 22a is journaled or rotatably supported in brace members 20, for example, by bearings 22b, and rotatably mounts hub 24 and blades 26 inwardly of perimeter member 18. Therefore, as noted above, the connection between the blade assembly and the supporting structure for the blade assembly is gearless, though as noted a gear may be included.

Also mounted to shaft 22a is a plurality of arms 28 that support magnets 30. Suitable magnets include nickel plated neodymium iron boron magnets. The size of the magnet may vary but a suitable size includes a 2 inch by 2 inch by ½ inch thick magnet, or may include thicker magnets, such as about 0.7", 0.8" or 1.0" thick magnets. As will be more fully described below, magnets 30 are positioned in relatively close proximity to a stator coil assembly 32, which is supported in perimeter or annular member 18 so that when the turbine blade assembly 22 rotates with shaft 22a, arms 28 and magnets 30 will similarly rotate to thereby induce current flow in the coils of the stator coil assembly.

In the illustrated embodiment, turbine blade assembly 22 includes six blades 26, which are evenly spaced around shaft 22a. The diameter of the turbine blade assembly may be varied depending on the application, but for home use, including roof-top mountings, or even commercial use, a diameter of about 6 feet has been found to balance aesthetics and mounting logistics, with electrical generation, though larger or smaller sizes can be used. For other applications, including for example marine applications where the turbine is used to recharge a boat battery, for example, the size may be smaller. Additionally, the number of blades and magnets may be varied. As will be more fully appreciated from the following description, in addition to being able to make the wind turbine compact in size, the weight of the wind turbine may be significantly less than conventional wind turbines. For example, the weight may be less than 150 lbs., less than 125 lbs, or less than 100 lbs depending on the size.

Further, the blades may be designed with aerodynamic profiles so as to optimize energy transfer from the wind to the rotating turbine blade system. For example, such optimized aerodynamic blade profile may employ tapering of the blade extremity to reduce the wind shear and blade deflections at high speeds. While suitable blades may include commercially available blades, which are commonly used in conventional turbines, the blades may alternately be rectangular bars with a wind attack angle between 5° and 10°, which may offer more efficient operation at low wind speeds and, further, can be made at lower cost than conventional blades. Further, as will be more fully described below the blades may have a varying wind attack angle along its wind facing edge. It should be understood that the blade design selection and attack angle can be varied for a given turbine size and wind speed operating regime. Additionally, the shaft may be configured to offer minimal drag to the wind and can be made of an aerodynamic cross-sectional profile, including a round cross-section, depending on the wind regimes and weight considerations.

As shown in FIG. 2, magnets 30 are positioned so that they extend into perimeter frame member 18 and into the stator coil assembly. In this manner, when shaft 22a rotates about its rotational axis, the magnets will translate relative to the stator coil assembly and thereby induce current flow in the coils of the stator coil assembly. For further details of the coils in the stator coil assembly, reference is made to the above referenced copending application entitled TURBINE ENERGY GENERATING SYSTEM.

Arms 28 may be formed from a transverse rod 35, such as a metal rod, including an aluminum rod, which as noted is supported by shaft 22a of turbine blade assembly 22. In this manner, rod 35 is independent from turbine blades 26 but rotates in unison with the respective blades by virtue of rotation with shaft 22a. While only two arms or one rod is illustrated, it should be understood that more than one rod and one set of magnets may be used to double, triple or quadruple the number of magnets in the turbine. However, it should be noted that with an increased number of magnets, the weight of the rotating system is increased. As a result, with an increased number of magnets, the wind speed at which the turbine can start generating power may be increased.

By placing the magnets at the ends of the rod, the turbine blades are allowed to deflect under the high wind speeds without affecting the accuracy and placement of the magnets within the stator housing, which may simplify operation and extend electricity generation performance. As will more fully described below, however, the magnets may be supported at the distal ends or tips of the respective turbine blades by a rim or ring that is mounted to the turbine blades, which would reduce the blade deflections and which is more fully described below.

Referring to FIGS. 3 and 4, the number 110 generally designates another embodiment of a wind turbine of the present invention. Turbine 110, similar to turbine 10, includes a frame 112 and a base 114. Frame 112 and base 114 may be also be formed from suitable metal components, including aluminum or stainless steel components, or in some applications composite materials may also be suitable. In the illustrated embodiment, base 114 includes a fixed base portion 114a and a rotatable base portion 114b to which frame 112 is mounted. In this manner, the frame may be repositioned, for example, to reposition the turbine blades relative to the wind. A suitable control system for controlling the position of turbine blade assembly and frame is described in copending application Ser. No. 61/179,903, filed May 20, 2009, WIND TURBINE AND CONTROL SYSTEM, which is incorporated by reference in its entirety herein.

Frame 112 includes an annular member 118 and two annular frame members 120a and 120b, which support annular member 118 on base 114, and more specifically on rotatable base portion 114b. Frame members 120a and 120b also support turbine blade assembly 122 and, similar to members 20, include bearings 122b for supporting shaft 122a of turbine blade assembly 122. Annular member 118 also similar to the previous embodiment supports a stator coil assembly 132, which is supported radially outward of turbine blade assembly 122, and more specifically radially outward of turbine blades 126.

In the illustrated embodiment, frame members 120a and 120b comprise wire fame members formed from, for example, heavy gauge metal wire or small diameter rods, such as aluminum wire or rods, that form two concentric annular members 134a and 134b, which support a plurality of radial arms 136. Radial arms 136 in turn support bushings 122b that rotatably support shaft 122a of turbine blade assembly 122. As best seen in FIG. 4, the outer annular members 134a are then mounted to movable base portion 114b of base 114, on for example a pair of posts 114c. For example, annular members 134a may be welded or otherwise fastened to posts 114c.

Annular member 118 is mounted between frame members 120a and 120b, inwardly of outer annular frame member 134a. Similarly to the previous embodiment, magnets 130 are mounted to arms 128, which are mounted to shaft 122a, such that magnets 130 extend into the stator coil assembly 132. In addition, with this configuration, magnets 130 have an angular velocity greater than the angular velocity of the hub that mounts turbine blade to shaft 122a and equal or greater than the angular velocity of the turbine blades. As noted in reference to the first embodiment, the arms rotate with the shaft 122a and are therefore rotated when the turbine blades rotate.

Referring to FIG. 5, annular member 118 is mounted to frame members 120a and 120b by fasteners and forms a stator coil assembly housing 140 for stator coil assembly 132. Housing 140 comprises a generally annular channel-shaped member that may extend around the full circumference of the turbine wheel, as shown so that it fully encircles the path of the turbine blades or just around a portion of the path. For example, as will be more fully described below, the stator coil assembly may extend over only a portion of the path of the turbine wheel and may be positioned at top most position (12 o'clock position) of the blades or at the bottom most position (6 o'clock) or in between.

Stator coil assembly housing 140 as noted has a generally channel-shaped cross-section and forms a channel 140a with an open side 140b into which the magnets 130 extend. Housing 140 is formed from a non-magnetic material, for example, plastic. The internal spacing between the opposed stator housing side walls is sized to minimize the gap 140c, for example an air gap, between the respective side wall of the stator housing and the respective magnet to reduce the attenuation of the flux induced by the rotating magnets.

The stator coil assembly 132 includes a plurality of coils formed from a conductive wire, such as copper or aluminum wire. For example, the coils may be made from a double-loop copper wire of gauges in a range of about ten to twenty-six, which supported inside housing 140. The copper wire gauge can be varied depending on the turbine size and power output design requirements.

As described in the referenced application, the coils are formed from a conductive wire that is wound in a manner to increase the electric generation efficiency. This achieved at least in part by configuring the coil to straddle and extend over the two major surfaces of the magnets. In this manner, flux from both, sides (major surfaces) of the magnet is harnessed. As described in the above referenced application, in order for the current to be additive, the coils include two leg portions 150a and 150b that straddle the magnet, which are interconnected by a turn or cross-over portion 150c, which cross-over portion allows the electrical current flow induced in both legs 150a and 150b to be additive. Further as best seen in FIG. 5, in order to optimize additive current flow, the magnets are positioned to extend far enough into the channel formed by the coil loops so that they are aligned between the coil loops and further spaced from the loop turn or twist area (both from the upper and lower coil turn areas). Also to facilitate the positioning of the magnets in the stator housing channel, a pin 142 may be mounted to the end of the magnet or to the end of the arm, which extends into a guide channel 144 formed in housing 140.

In this manner, when the magnet or magnets pass by the respective stator coil assembly or assemblies, the magnetic flux caused by the moving magnet induces electrical current to flow through the respective coils. Further, by positioning the coil on either side of the stator housing and, moreover connecting the coils in a manner to have their electrical flow additive, the turbine of the present invention may provide an increased electrical output for a given rotation of a shaft of a conventional turbine. Furthermore, because the turbines of the present invention do not need to use a gear box to translate the rotary motion of the turbine blade shaft into rotary motion that induces current flow, the various turbines of the present invention may generate electricity at lower wind speeds than conventional turbines that incorporate gears or gear boxes. Though it should be understood that a gear or gear box may be coupled to the shaft for example to drive a generator to provide an additional source of electrical generation.

Figure 6:
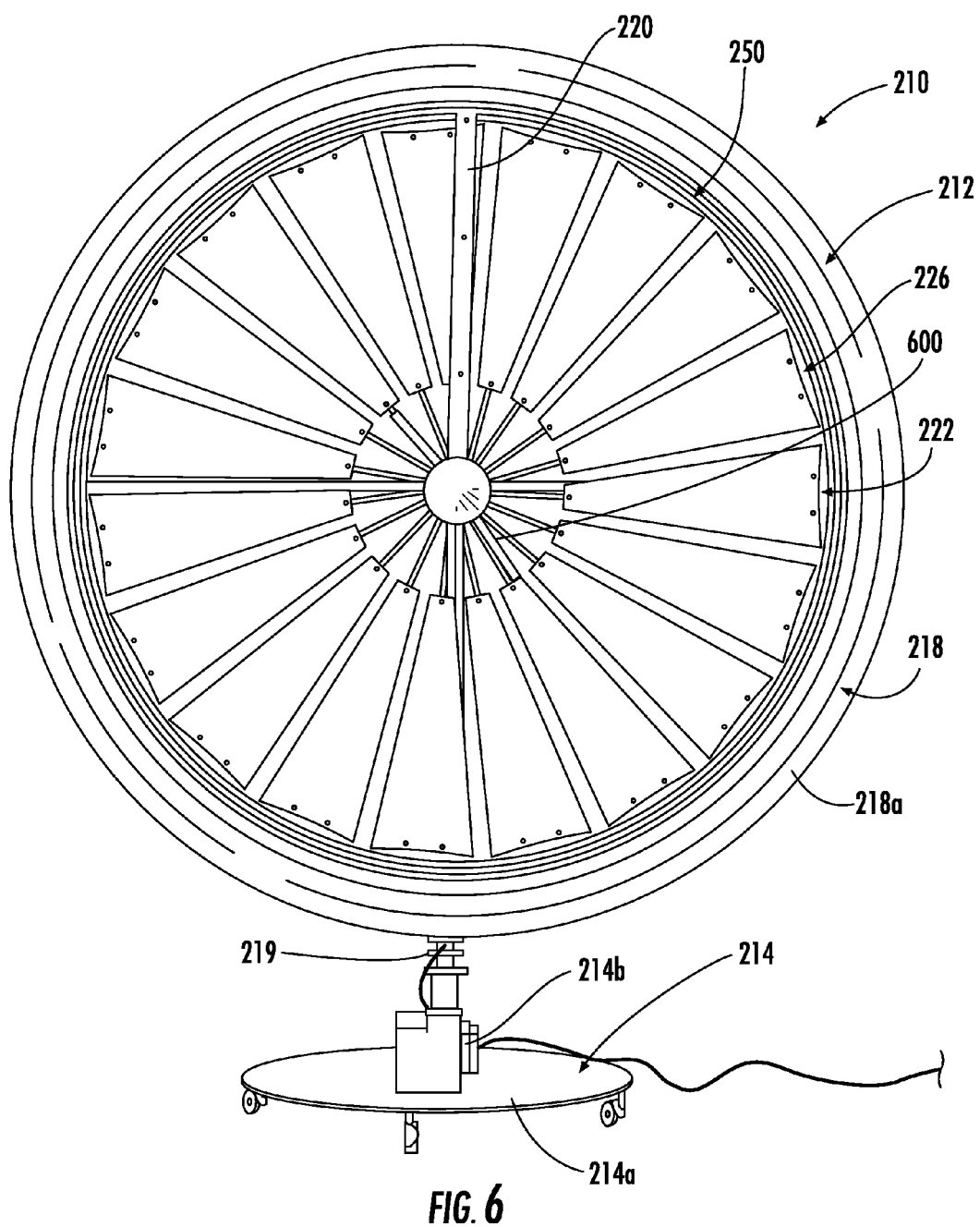
FIG. 6 is an elevation view of another embodiment of the wind turbine of the present invention with a spoked wheel.

Referring to FIG. 6, the numeral 210 generally designates another embodiment of a wind turbine of the present invention. Turbine 210, similar to turbines 10 and 110, includes a frame 212 and a turbine blade assembly 222 supported by frame 212 on a base 214. Frame 212 and base 214 may be also be formed from suitable metal components, including aluminum or stainless steel components, or in some applications composite materials. In the illustrated embodiment, base 214 comprises a movable base portion 214a and a frame mounting portion 214b, which is mounted to movable base portion 214a and to which frame 212 is mounted.

Frame 212 includes an annular cover 218, a post 219, brace frame members 220, and a turbine blade assembly 222. Brace frame members 220 mount cover 218 and turbine blade assembly 222 to post 219, which in turn mounts cover 218, frame members 220 and turbine blade assembly 222 to base 214. Cover 218 may be made from a metal sheet, such as an aluminum or stainless steel sheet, or a polymer, such as plastic, and also may be made from a composite material, again depending on the application.

Figure 7:
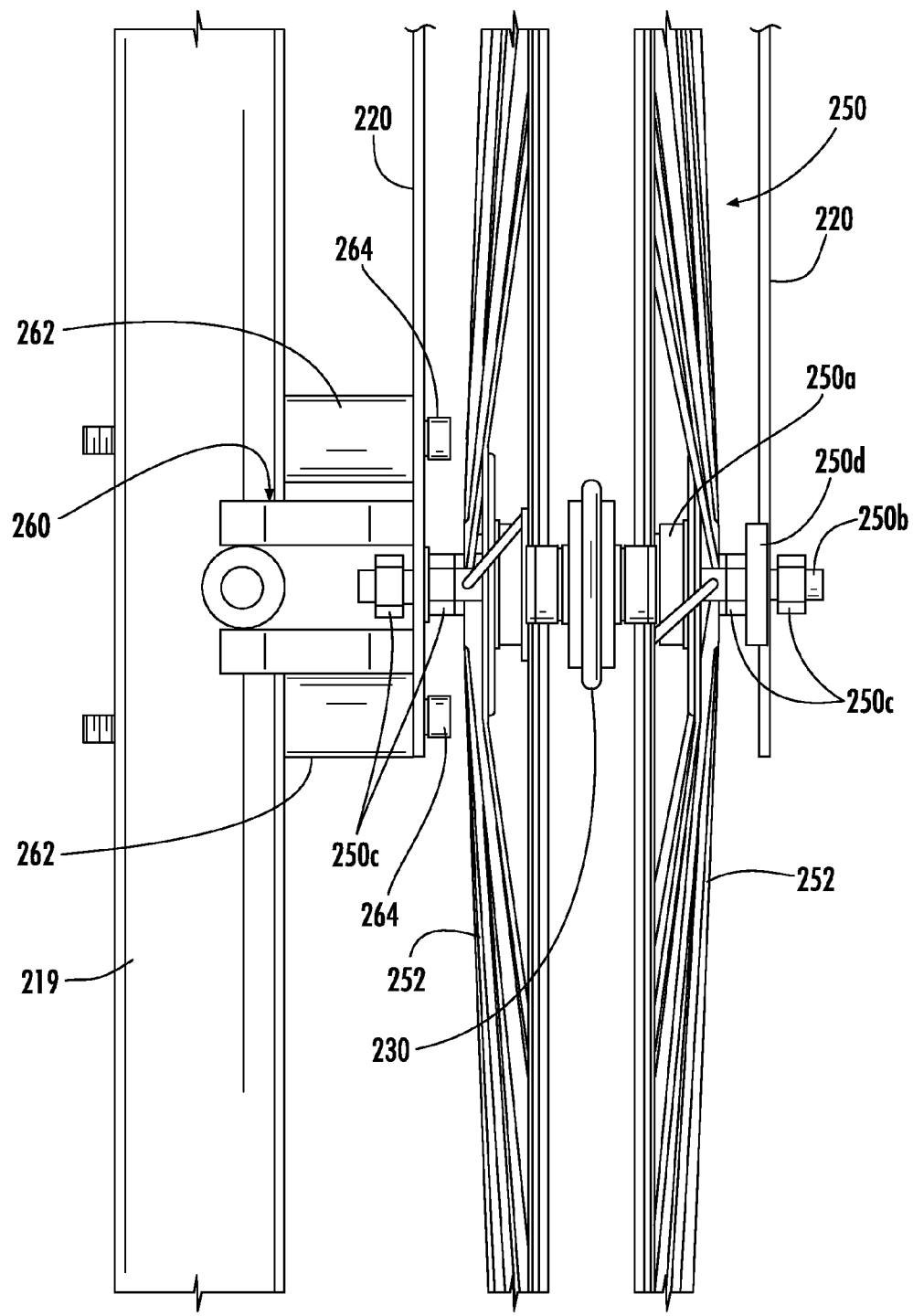
FIG. 7 is an enlarged view of the wheel and magnet mounting arrangement.
Figure 8:
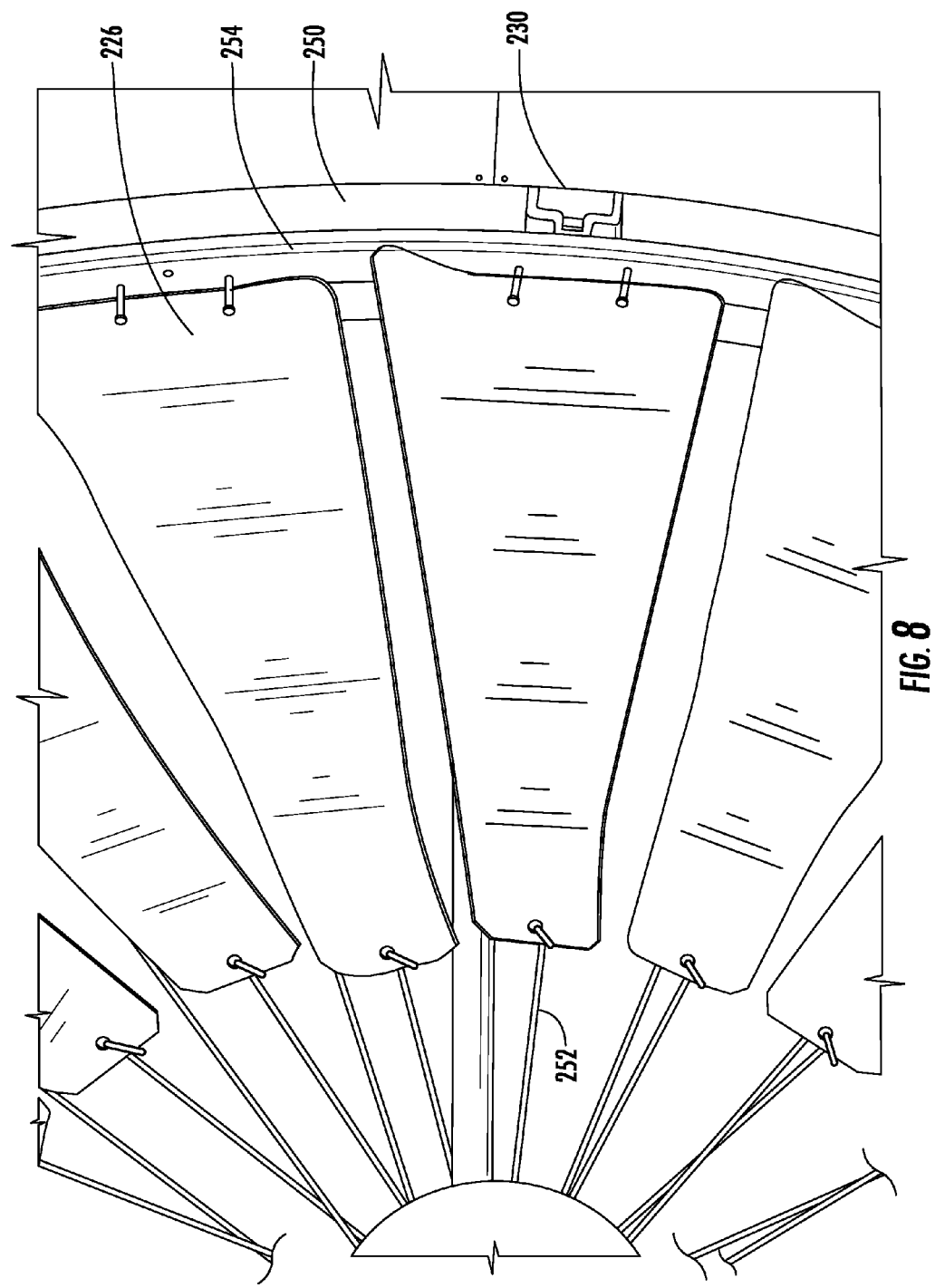
FIG. 8 is an enlarged view of the wind turbine blade mounting details.
Figure 9:
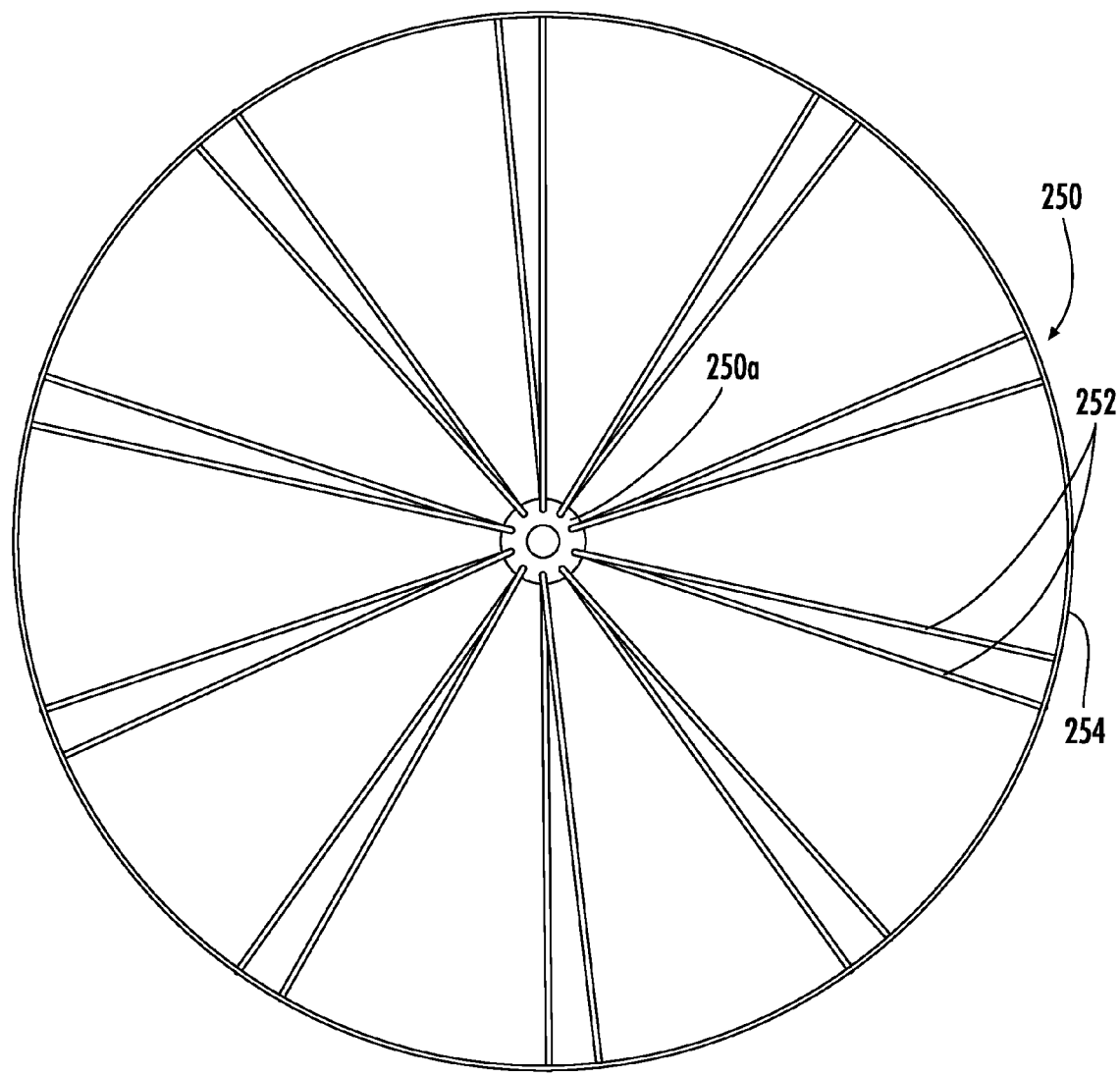
FIG. 9 is an elevation view of the spoked wheel with the turbine blades removed for clarity.

In the illustrated embodiment, turbine blade assembly 222 includes a wheel 250 (FIG. 9) to which a plurality of turbine blades 226 are mounted. As best seen in FIG. 9, wheel 250 includes a central hub 250a and a plurality of radially extending spokes 252 that extend from hub 250a at their proximal ends and support a ring or rim 254 at their distal ends. As would be understood, the hub, the spokes, and the rim may also be formed from a metal material, such as aluminum or stainless steel. As best seen in FIG. 7, the spokes are offset at their connections to the hub but are mounted at spaced connections along a common annular path at the rim (see FIGS. 8 and 10) so that one set or group of spokes lies on one conical surface and the other lies on another conical surface, similar to a bike wheel. Stated another way, a first group of the spokes extend from a first set of spaced connections at the hub to a second set of spaced connections arranged along an annular path on the rim. The second group of spokes extends from a third set of spaced connections at the hub to a fourth set of spaced connections along the same annular path as the second set of connections on the rim, where the first set of spaced connections is spaced from the third set of spaced connections along the hub's axis of rotation wherein the first group of spokes is offset from the second group of spokes at the hub but converge at the rim. As will be more fully described below, spokes 252 provide mounting surfaces for the turbine blades 226, which, in the illustrated embodiment, extend over a high percentage of the turbine's windward side, for example from about 50% to 70% of the windward side of the turbine, which is means the turbine has about a solidity from about 50% to 70%. As will be described, below the solidity of the turbine may be varied.

Referring again to FIG. 7, wheel 250 is supported by and journaled in brace frame members 220 by a shaft 250b, which extends through members 220 and is secured thereto by nuts 250c and optional washers 250d. Members 220 are then mounted to post 219 by brackets 260 and posts 262, which receive fasteners 264, such as bolts, that extend through the respective member 220, which is proximate post 219, and into post 219. Therefore, as noted above, the connection between the wheel and the supporting structure for the wheel is gearless. Though as noted a gear may be included.

Figure 10:
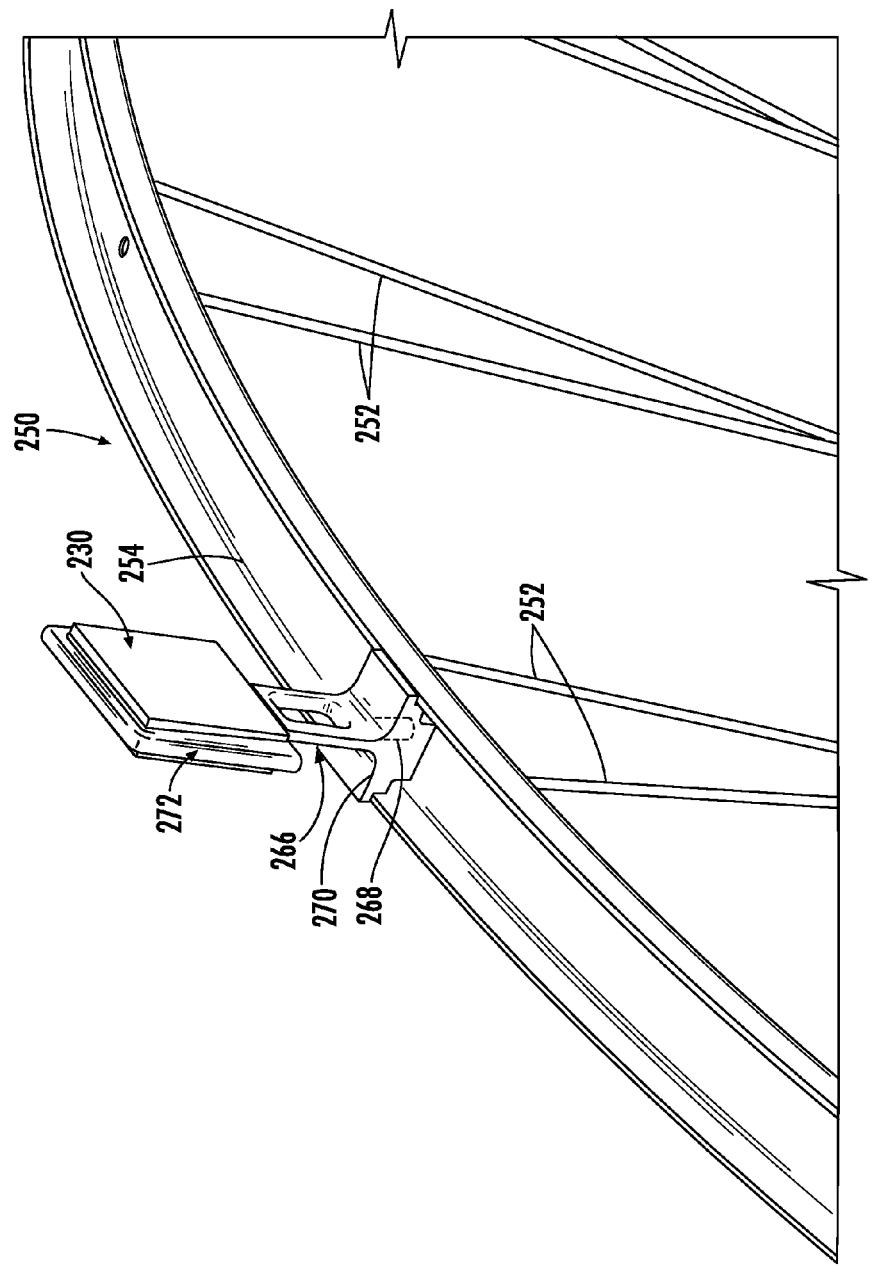
FIG. 10 is an enlarged view of one mounting arrangement of the magnet to the rim of the spoked wheel.
Figure 11:
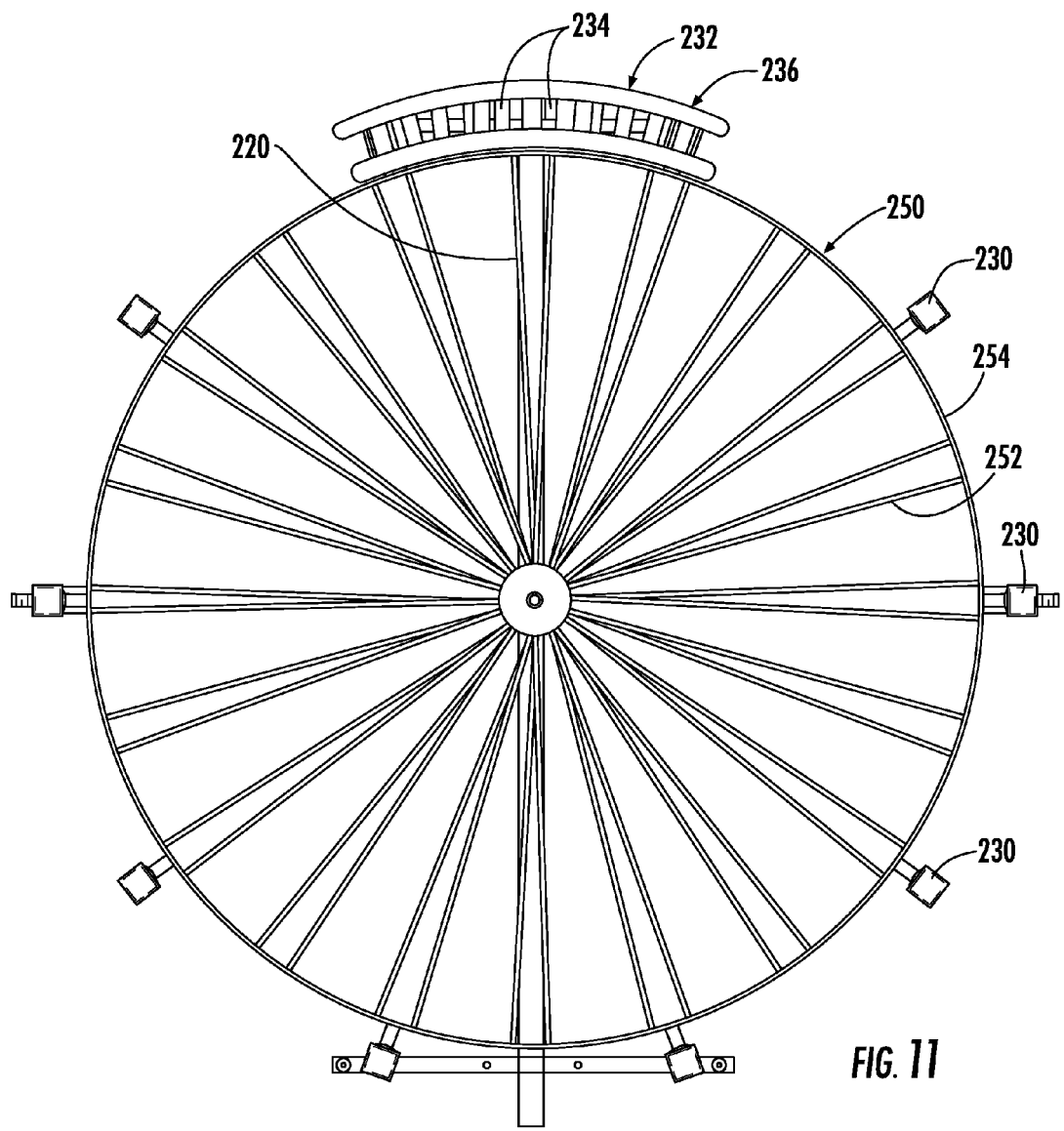
FIG. 11 is a similar view to FIG. 6 with the coil cover and blades removed for clarity.

In the illustrated embodiment, and as best seen in FIGS. 10 and 11, magnets 230 are mounted to wheel 250 and, more specifically, to rim 254 by a bracket 266, which is secured to rim 254 by a fastener or fasteners 268. Bracket 266 includes a mounting portion 270 that supports frame 272, which extends radially outward from mounting portion 270, and which supports magnet 230 therein. Magnets 230 are mounted such that they extend outwardly and lie (their major surfaces lie) in the same plane as the wheel and further between the plane defined by the windward side (side facing the incoming wind) of the blades and the plane defined by the leeward side (side facing the direction the wind is blowing) of the blades. In the illustrated embodiment, wheel 250 includes ten magnets 230, which are equally spaced around the wheel; however, it should be understood that more or fewer magnets may be used.

Figure 12:
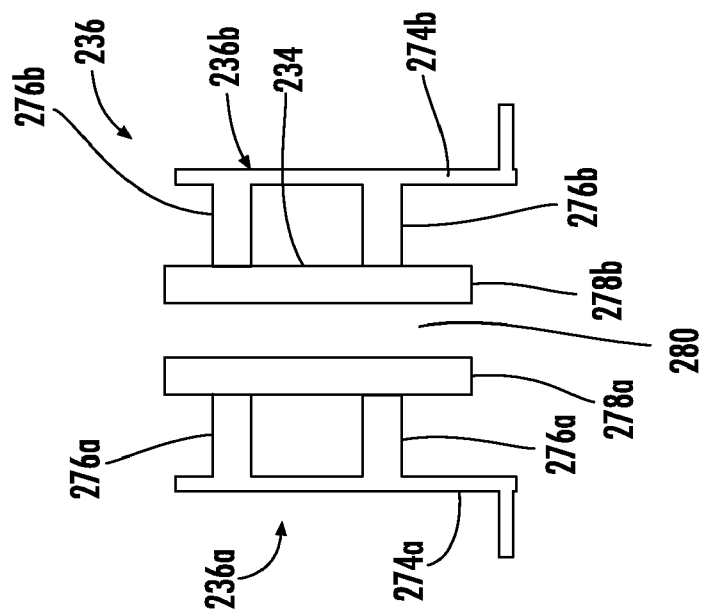
FIG. 12 is an enlarged view of the stator coil mounting arrangement.
Figure 13:
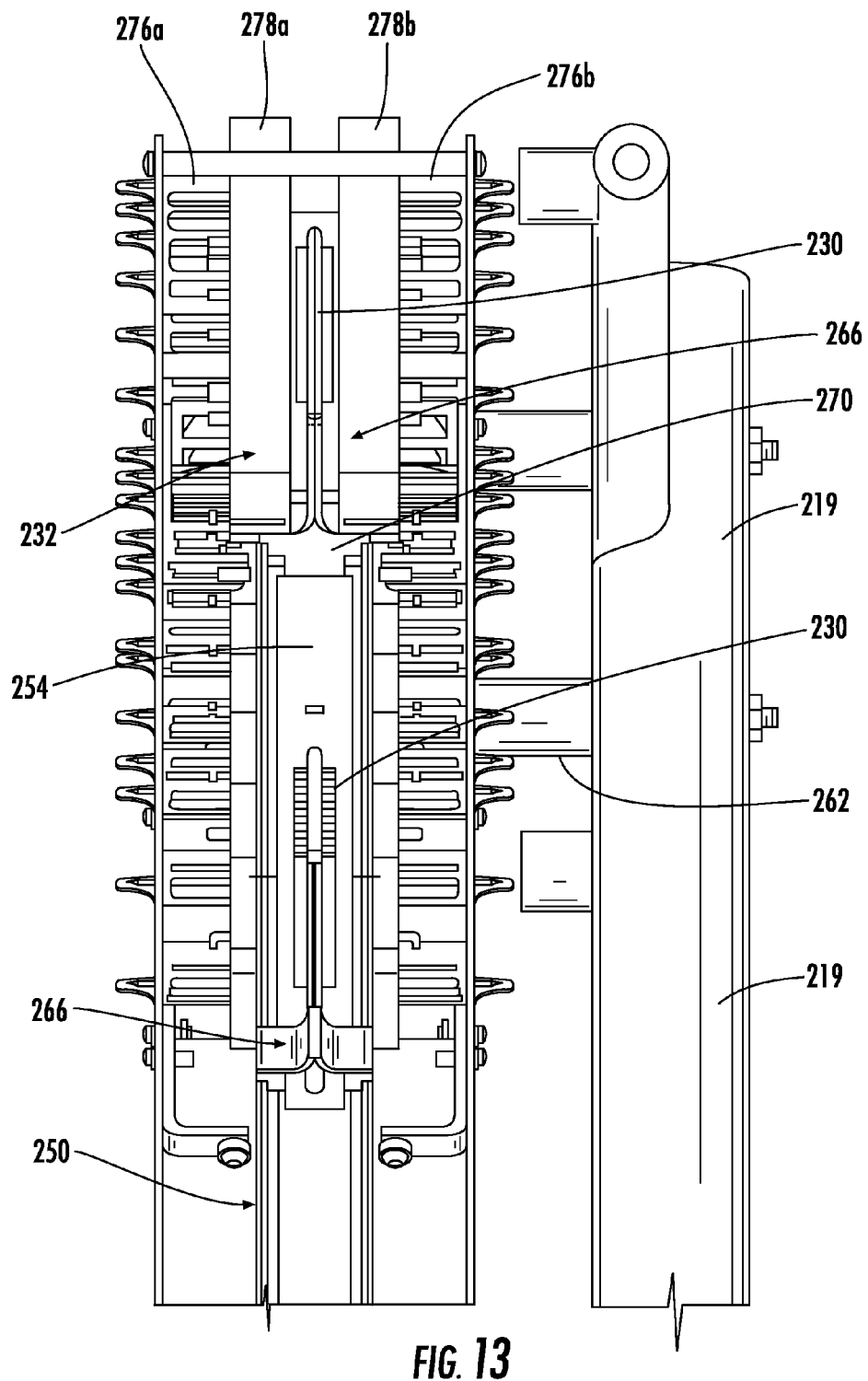
FIG. 13 is another enlarged view of the stator coil mounting arrangement and magnet mounting arrangement.

Referring to FIGS. 11 and 13, in the illustrated embodiment, stator coil assembly 232 is mounted to frame members 220 and is arranged around the outer perimeter of wheel 250. Further, in the illustrated embodiment, stator coil assembly 232 extends around only a portion of the circumference of the wheel and, further, is positioned at the top most blade position (12 o'clock). For example, stator coil assembly 232 may extend over an arcuate span in a range of about 30° to about 45°; though, it should be understood that it could be configured to extend over a greater range, including the full 360° circumference of the wind turbine. Stator coil assembly 232 includes support assembly 236, which is mounted to frame brace member 220 and positioned in close proximity to ring 254. Further, as best seen in FIG. 12, support assembly 236 consists of a pair of brackets 236a and 236b, which are spaced apart and respectively mounted to frame members 220. Each bracket may comprise a generally L-shaped bracket and, further, include a pair of supports, for example in the form of cylindrical posts 276a that extend inwardly and support the stator coils 278a and 278b in a spaced relationship to thereby define a gap 280 between the respective stator coils. Stator coil assembly 232 is housed in cover 218 to thereby protect the stator coil assemblies and the respective magnets, as the magnets move though their circumferential path.

Figure 12A:
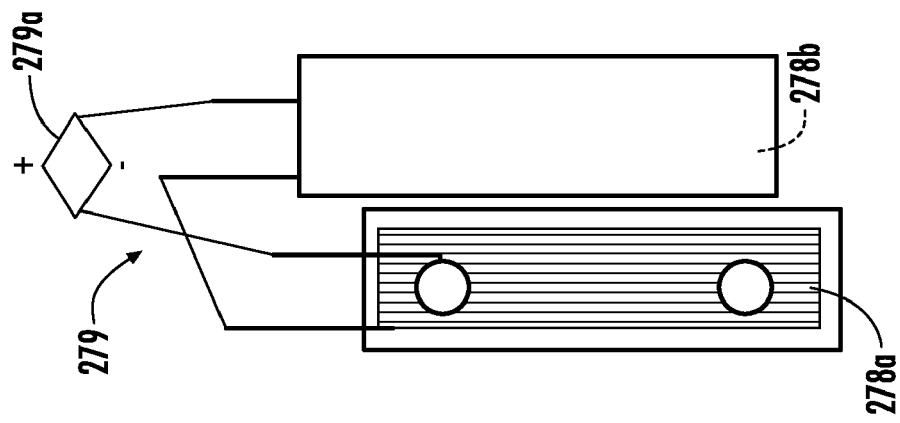
FIG. 12A is a schematic drawing of the stator coils and their interconnecting circuit.

Referring to FIG. 12A, each pair of stator coils 278a and 278b are interconnected by a circuit 279, which may include a rectifier 279a to locally generate direct current (DC) from each individual coil. If rectifiers are not used then alternating current (AC) is produced. This can be rectified at a later state if needed. The electrical output can then be converted to a standard 12 volt DC to charge a small 12 volt DC car battery or a 120 volt alternating current standard output voltage for direct use.

Figure 14:
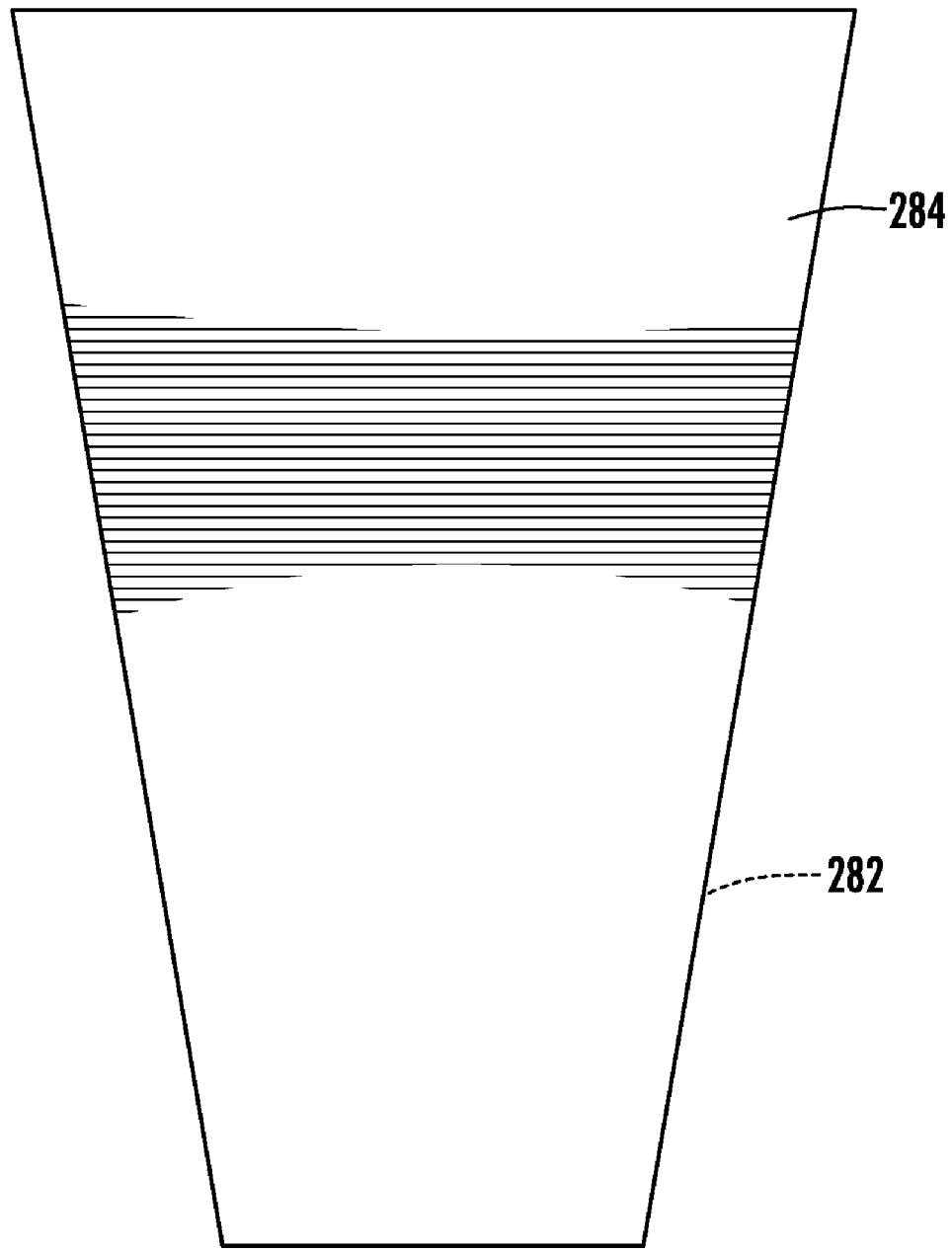
FIG. 14 is an enlarged view of a turbine blade.
Figure 14A:
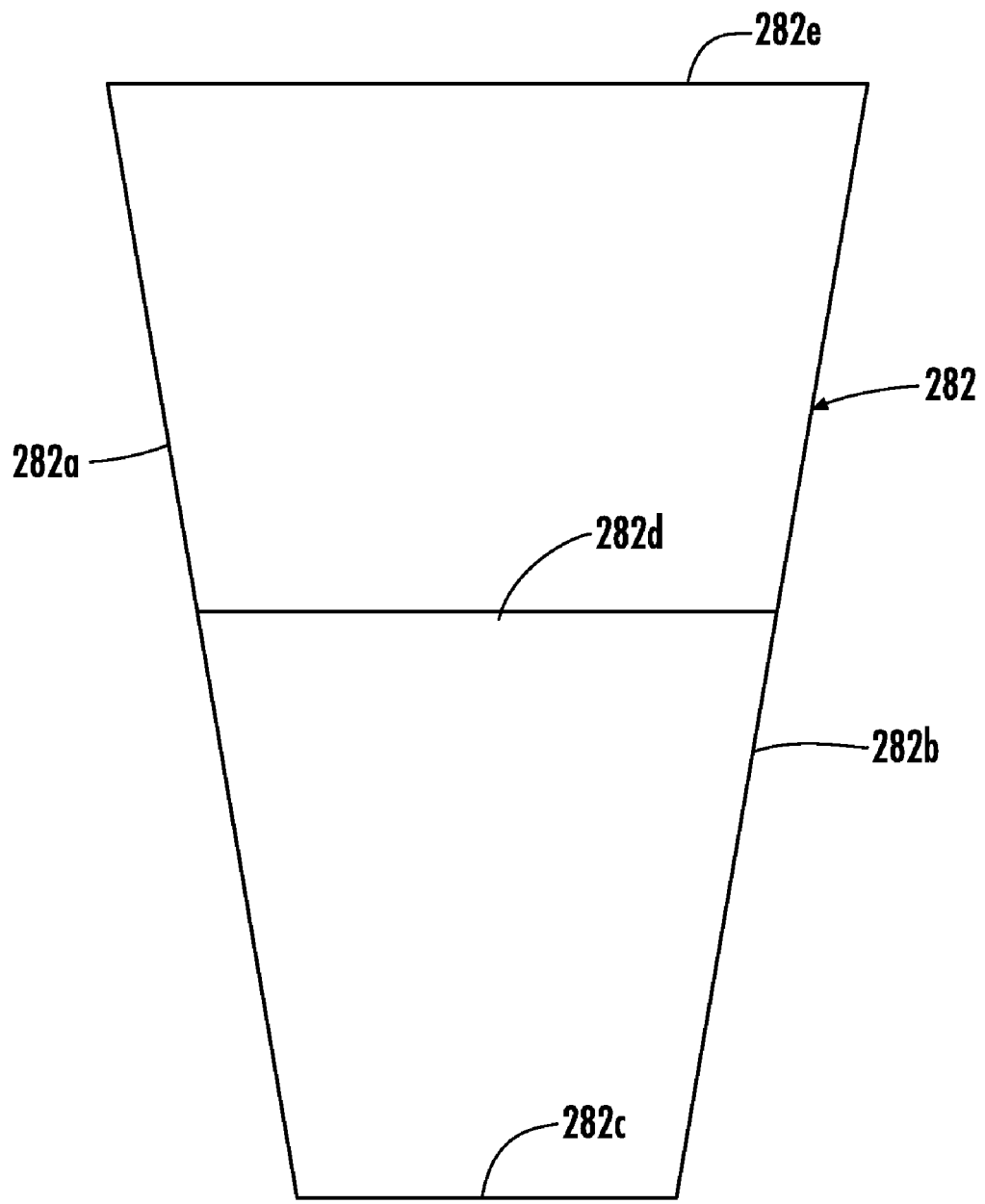
FIG. 14A is an enlarged view of the turbine blade frame.

Referring to FIGS. 14 and 14A, each blade 226 may be formed from a frame 282, such as a wire frame, and a flexible membrane 284, which may be formed from a fabric, such as nylon, polyester, or KEVLAR, or a thin sheet of a polymer material, such as plastic, which forms the web of the blade. Additionally, membrane 284 may be single-sided or two-sided—with one side mounted to one side of the frame, and the other side mounted to the other side of the frame. Frame 282 (FIG. 14A) has a generally isosceles trapezoid shape with two longitudinal sides 282a, 282b, which are aligned along radial axes of the wheel and are interconnected by transverse frame members 282c, 282d, and 282e. For example, frame 282 may be formed from a metal rod, such as aluminum or stainless steel or other rigid but light-weight materials. Membrane 284 is secured to frame 282, for example, by an adhesive, welds, stitching, or fasteners or the like.

Blades 226 then are mounted to the respective spokes 252 along their lengths by fasteners, such as snaps, ties, or the like, including clips formed from a spring material or an elastic material to allow the blades to deflect parallel to the wind, for example at high wind speeds. Further, as best seen in FIG. 8, the proximal end (end nearest hub 250a) of each blade may be secured to one spoke by a clip, while the other, wider distal end of the blade may be coupled to two spokes by two or more clips to support the distal end of the blade but not necessarily anchor the distal edge of the blade to the wheel's rim, thereby leaving a gap or gaps between the blade's distal edge and the rim of the wheel, which allows the blade to flex. Optionally, blades 226 are removable for repair and replacement.

When mounted to spokes 252, blades 226 are angled with respect to the central plane of the wheel. For example, blades 226 may be angled in a range, for example, from 2 degrees to 10 degrees including at about a 5 degree angle. At this angle it has been found that the turbine generates electricity at low speeds including as low as one mile per hour or less, including 0.3 miles per hour. Depending on the particular materials used, it also has been found that the turbine will operate up to 40 or even up to 60 miles per hour, though it may be desirable to limit the speed of the turbine. At the higher speeds, as described in copending application Ser. No. 61/179,903, filed May 20, 2009, entitled WIND TURBINE AND CONTROL SYSTEM, a microprocessor-based control system may be provided to change the direction of the turbine when the wind speed exceeds a desired maximum wind speed to thereby reduce the pressure on the blades. For example, the control system may turn the turbine into the wind to reduce the stress on the blades and on the wheel mounting components. In addition, as described below, the blades may be designed so that at higher speeds they reduce their surface area to reduce the solidity of the turbine and hence the speed of the turbine wheel.

Figure 15:
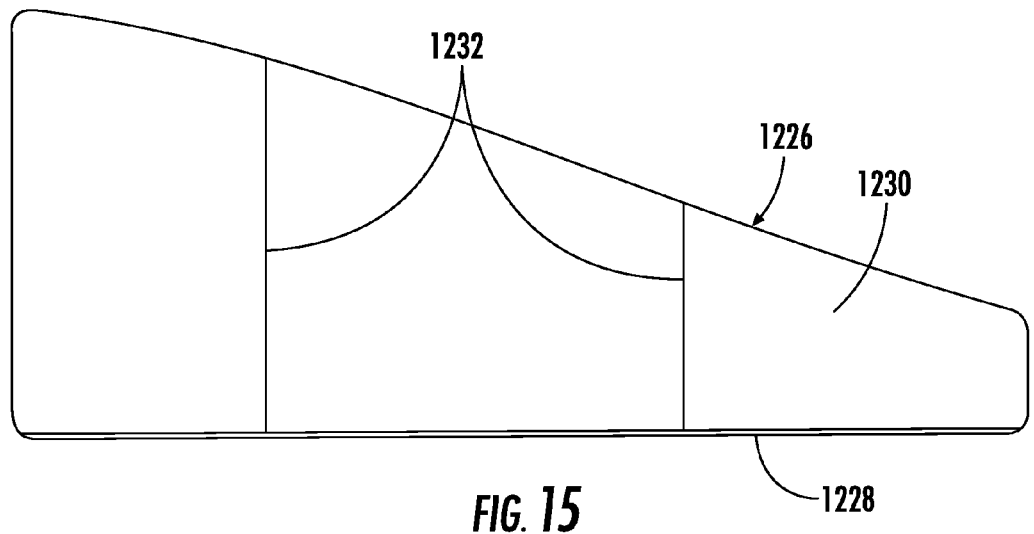
FIG. 15 is an elevation view of another embodiment of the turbine blade.
Figure 15A:
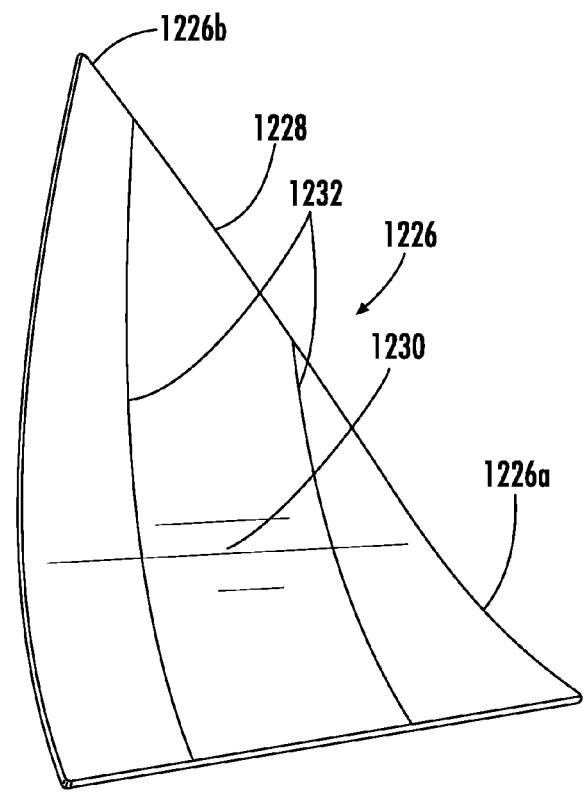
FIG. 15A is a side view of the turbine blade of FIG. 15.
Figure 15B:
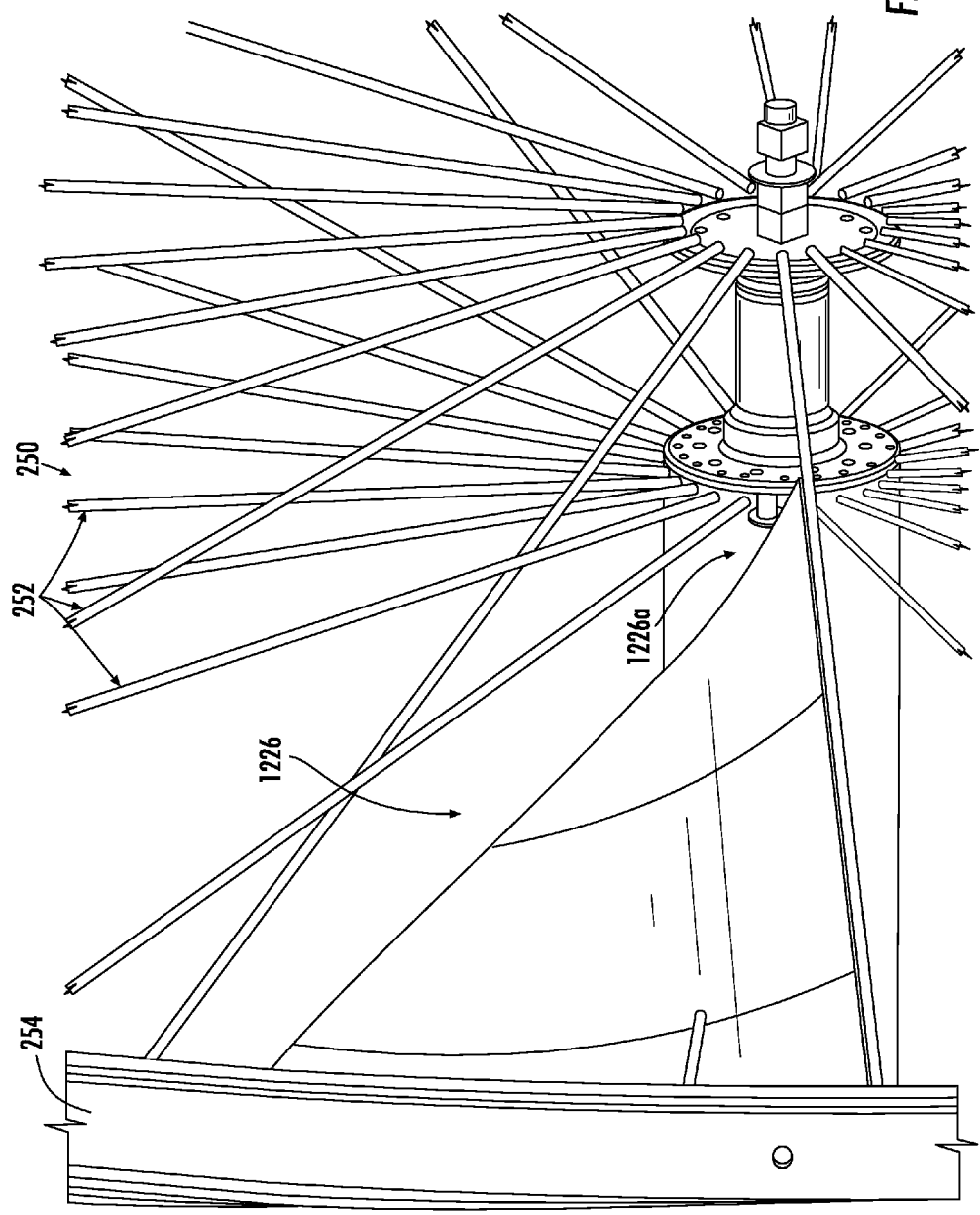
FIG. 15B is an enlarge view illustrating the turbine blade of FIG. 15 mounted to the turbine wheel.

Referring to FIGS. 15, 15A, and 15B, the numeral 1226 designates an alternate embodiment of the turbine blade. In the illustrated embodiment, blade 1226 is a molded blade and similar to the previous embodiment is mounted to a spoke 252 at one side and at its distal end to another spoke. As best seen in FIG. 15B, each blade 1226 is mounted to a respective spoke 252 along one edge along its full length by fasteners, such as snaps, ties, or the like, so that the blade is fully supported along its length (either at spaced intervals or continuously)

along one edge by the wheel spoke and therefore limit deflection at the full range of wind operation of the wind turbine. However, the blade may be mounted using a clip that is made of elastic or a spring material to allow for blade deflection generally parallel to the wind, for example at high speeds. This may provide an automatic safety limit for the turbine wheel rotation.

For example, blade 1226 may be molded from a moldable material, such as a polymer, including a plastic, or a fabric, such as nylon or KEVLAR. Suitable polymers include glass-filled nylon, polyethylene, or a carbon fiber reinforced nylon or the like. In order to stiffen blade 1226, blade 1226 may be formed or provided with an outer perimeter rim 1228 and a web 1230 that extends between the outer rim. Rim 1228 may be formed from the same material as the web and simply have a greater thickness than the web to thereby in effect form a reinforcement frame, or rim 1228 may be formed from an insert material, for example a metal frame, such as an aluminum frame, that is molded with the blade to impart greater stiffness while reducing the weight of the blade, again thereby forming a frame for the web.

For example, rim 1228 may be formed, for example by molding, from one material which is then inserted into the mold where the material forming the web is then applied, for example, by injection molding. The rim may also comprise a wire frame similar to the previous embodiment, with the web molded over the frame. Alternately, the blade may be molded using two different materials using two-shot molding. Further, the web 1230 may be reinforced by ribs 1232 that extend across the face (either windward or leeward side) of the blade and optionally between two opposed sides of the rim 1228. Ribs 1232 may have a greater thickness than web 1230 and may have the same, lesser or greater thickness as rim 1228. Again the ribs may be pre-formed and then inset into the mold or may be formed with the web, for example during molding, including using two shot molding.

For a constant wind speed and wheel rotational speed, the blade root, nearest the wheel hub, experiences the slowest radial velocity. Whereas the blade tip, nearest the wheel rim would experience the maximum radial velocity. As best seen in FIGS. 15A and 15B, the blade angle of attack may thus be varied along its length to accommodate efficient aerodynamic energy conversion to mechanical rotation of the wheel. For example, in the illustrated embodiment, the attack angle of blade 1226 may decrease along its length, from its blade root (proximal end) 1226a to its blade tip (distal end) 1226b. Therefore, the blade is asymmetrical. For example, the blade root 1226a may have a very steep attack angle, for example, in a range of 40 degrees to 50 degrees, or in a range of 42 degrees to 48 degrees or approximately 45 degrees. The attack angle at the tip may range from 0 degrees to 10 degrees, or in a range of 2 degrees to 5 degrees or approximately 3 degrees. This is achieved by the asymmetrical shape of the blade, which is concave on its windward side and convex on its leeward side. Given that the blade is formed form a thin web (except for its perimeter rim and reinforcing intermediate ribs), the blade's asymmetry can be formed from twisting the blade during its formation from its root end (end nearest to the hub) to its distal end (tip). Therefore, as would be understood the wind facing surface of each blade is not perpendicular to the incoming wind. This design approach increases the lift coefficient and minimizes the drag forces along the blade length at various wind speeds.

Figure 16:
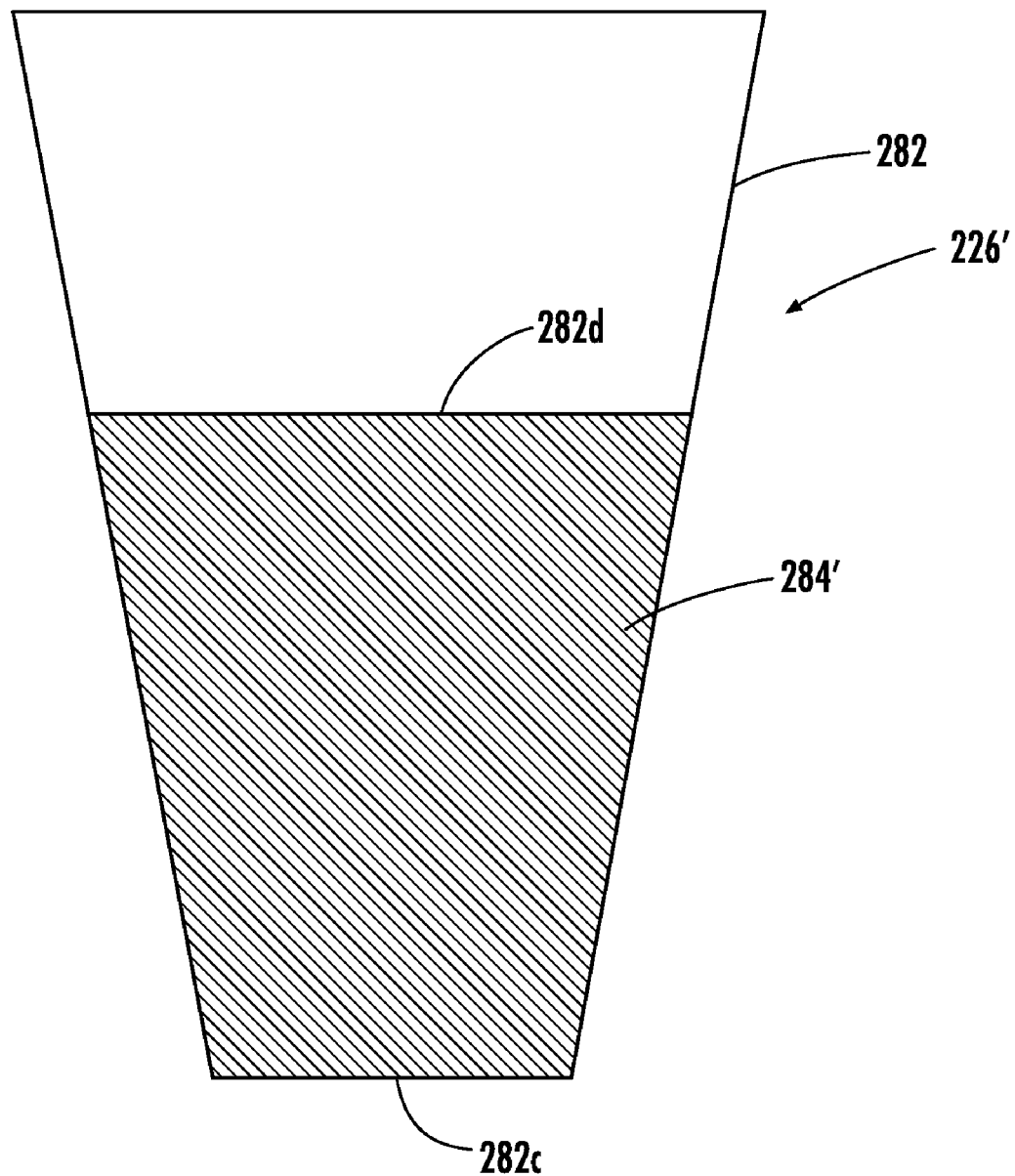
FIG. 16 is an enlarged view of another embodiment of the turbine blade that incorporates a partial membrane mounted to the turbine blade frame.
Figure 17:
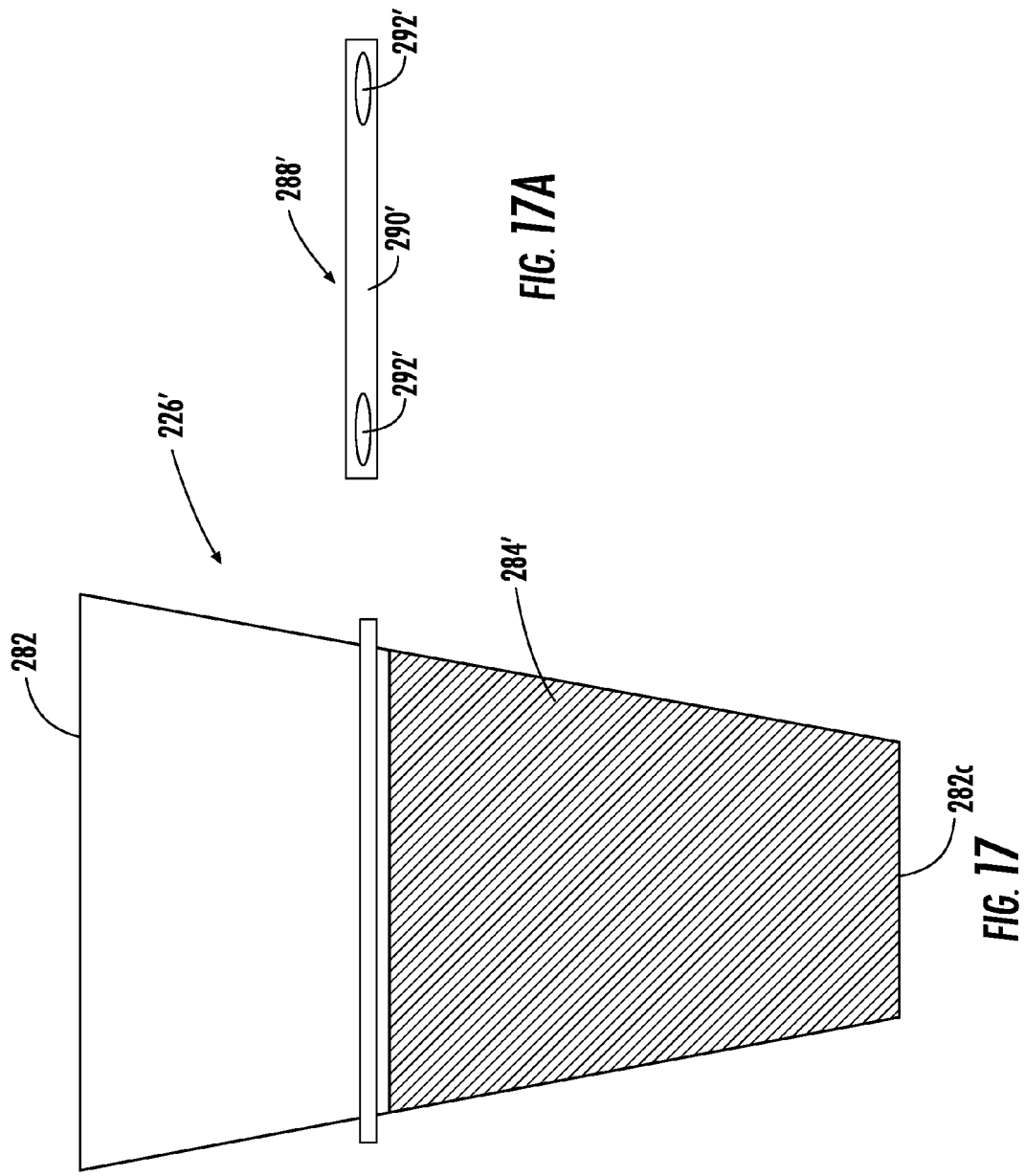
FIG. 17 illustrates the turbine blade of FIG. 16 with a second partial membrane support mounted to the frame for movably mounting a second partial membrane to the frame.
Figure 18:
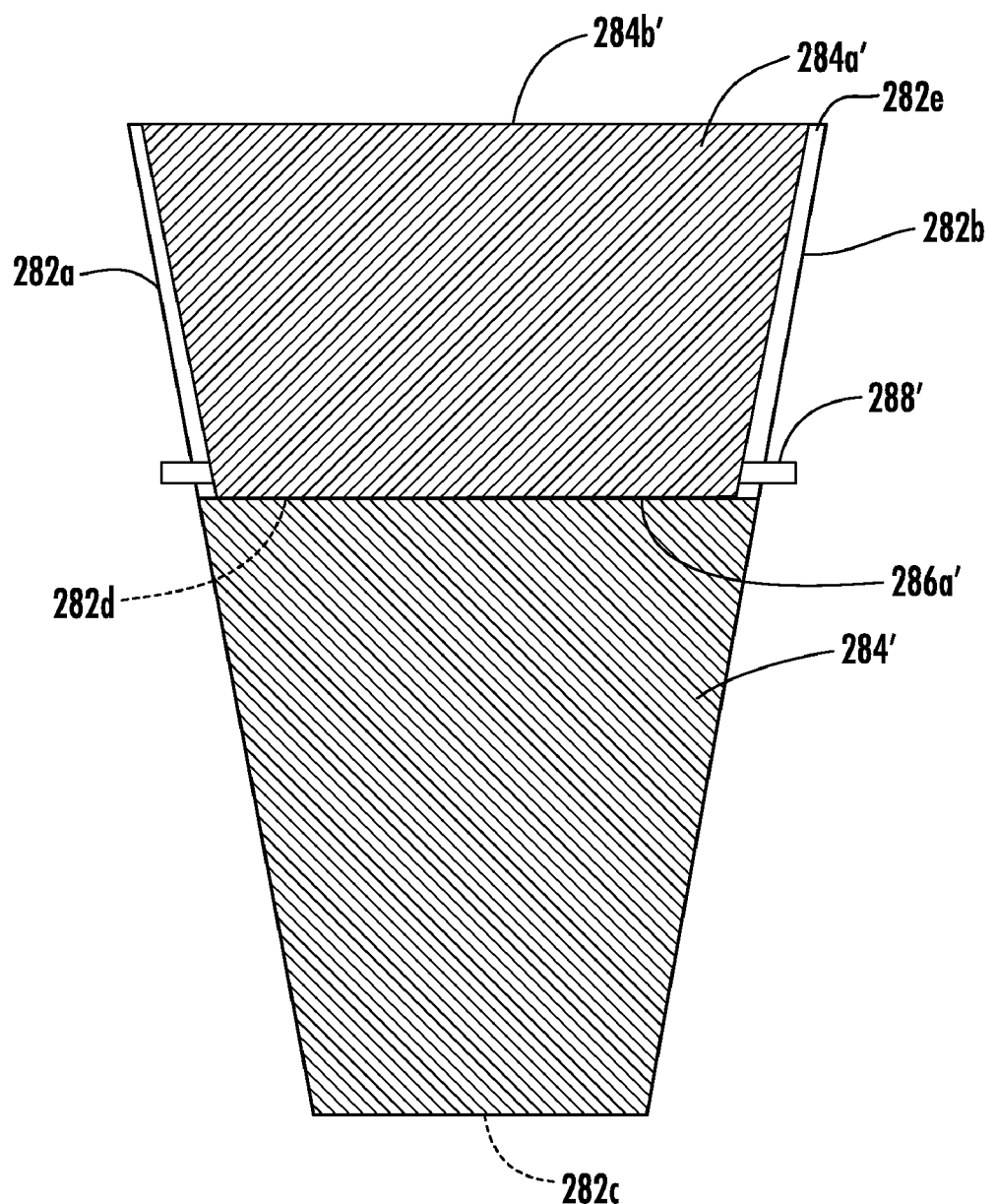
FIG. 18 illustrates the turbine blade of FIG. 16 with the second partial membrane mounted to the frame.
Figure 19:
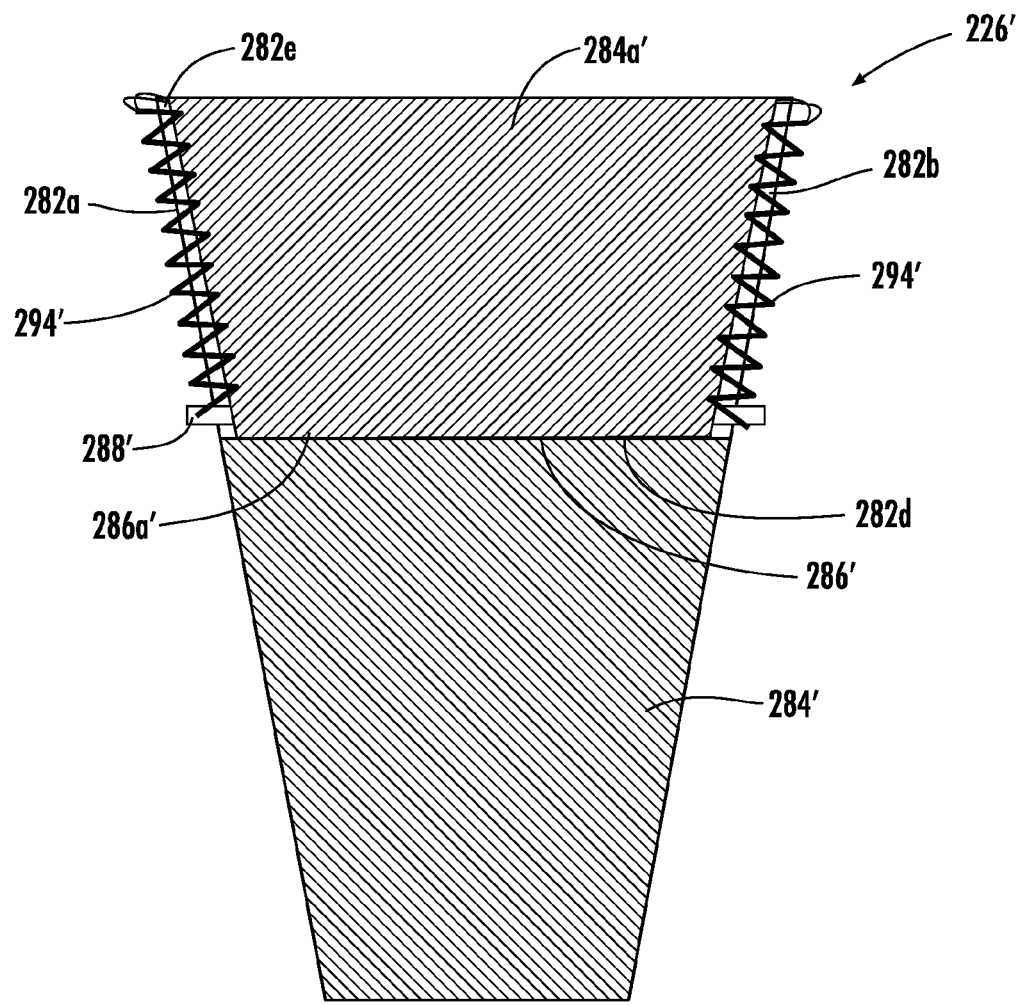
FIG. 19 illustrates the turbine blade of FIG. 18 with a biasing member for biasing the second partial membrane in a position that provides the maximum solidity to the turbine blade.

Referring to FIGS. 16-18, the numeral 226' designates an alternate embodiment of the blades in which the blades are configured to reduce the solidity of the turbine wheel. As noted above solidity refers to the amount of surface area defined by the circumference of the blade tips covered by the blades. For example, a 100% solidity would mean that the blades cover the entire surface. For a 30% solidity, the blades cover 30% of the area. As will be more fully described below, each blade 226' may be adapted to self-adjust the solidity in response to increased wind speeds.

Referring again to FIGS. 16-19, blade 226' includes a frame 282 similar to blade 226 and a membrane 284', which is similarly formed from a flexible material, such as a fabric or thin sheet of flexible material or the like. In the illustrated embodiment, membrane 284' comprises a primary, fixed partial membrane and extends from the inward transverse member 282c of frame 282 to the medial transverse member 282d and, therefore, only covers a portion of the frame 282. In order to vary the solidity, turbine blades 226' are configured to take advantage of the centrifugal forces acting on the turbine blade so that as the wind speed increases the solidity of the turbine blade assembly decreases.

Referring again to FIGS. 17-19, turbine blade 226' includes a second membrane 284a'. Membrane 284a' is mounted about frame 282 and extends between intermediate transverse frame member 282d and outermost transverse frame member 282e. Further, membrane 284a' is mounted such that its inwardly facing end 286a' is secured to a movable member 288' in the form of a plate 290'. Plate 290' includes with a pair of elongate guide openings 292', which allow the plate 290' to be mounted to side frame members 282a and 282b of frame 282 and slide along the frame. In this manner, the inwardly facing end 286a' of membrane 284a' may move relative to frame 282 and, further, compress toward its outer end 286b' to allow a gap to form between membranes 284a' and 284' to thereby reduce the solidity of the respective turbine blade.

To control the bending or folding of membrane 284a', a pair of springs are provided 294'. Springs 294' are coupled on one end to outermost transverse frame member 282e and, further, are extended along the respective side frame members 282a and 282b and coupled at their distal ends to transverse member 288'. Further, when mounted springs 294' are compressed so that the respective springs bias and urge transverse member 288' toward transverse member 282d of frame 282 to thereby maintain membrane 284a' in its extended state wherein the lower end 286a' abuts the outer end 286' of membrane 284'. As the wind speed increases and the centrifugal forces on the respective membranes increase, transverse membrane 288' will compress springs 294' and thereby allow membrane 284a' to compress, for example by folding. For example, member 284a' may be pleated so that membrane compresses in a controlled fashion.

It should be understood that the ratio of the secondary membrane 284' size relative to membrane 284' size may be varied to vary the change in solidity of the blade. Furthermore, the stiffness of the respective springs may be varied to adjust the responsiveness of the turbine blade. Therefore, as described above, the blades of the turbine may be adapted to reduce its solidity based on the wind speed. Consequently, as the blades rotate, the blades may self open based on the rpm.

Another option is to provide membranes formed from a material whose porosity increases with air pressure to thereby decrease its solidity.

Figure 20:
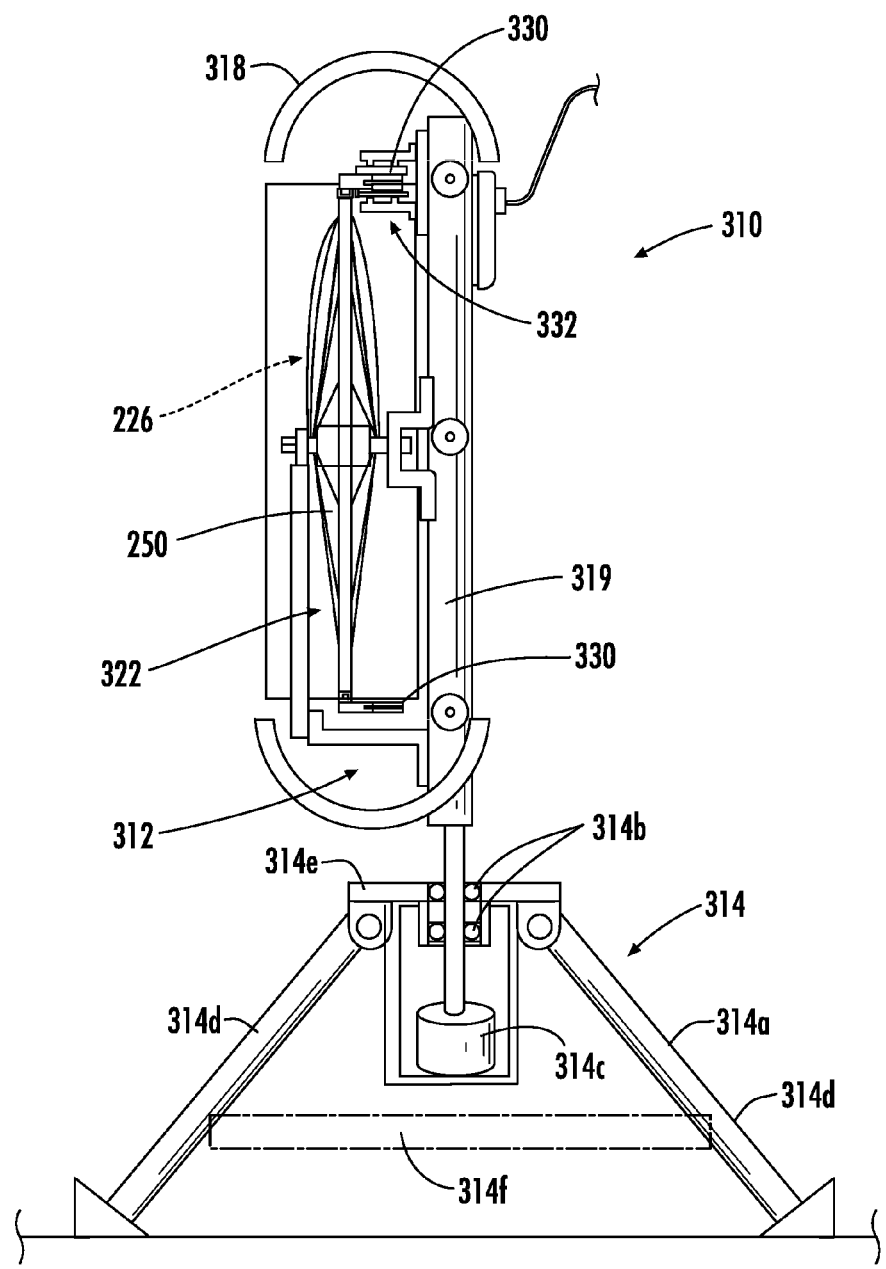
FIG. 20 is a side end elevation view of another embodiment of the wind turbine of the present invention.

Referring to FIG. 20, the numeral 310 designates another embodiment of the wind turbine of the present invention. Similar to the previous embodiments, wind turbine 310 includes a frame 312, a turbine blade assembly 322 supported by frame 312 on a post 319, which supports the frame on a base 314. Similar to the second embodiment, base 314 comprises a fixed base portion 314a but supports post 319 for rotational motion about fixed base portion 314a. As best seen in FIG. 20, post 319 is mounted in base 314 by bearings 314b and, further, may be driven by a motor 314c housed in base 314, which is controlled by a control system such as disclosed in the above reference copending application, entitled WIND TURBINE AND CONTROL SYSTEM, which is incorporated by reference herein in its entirety. Further, in the illustrated embodiment, fixed base portion 314a may include a base plate 314e and a plurality of support legs 314d which are pivotally mounted to base plate 314e to allow the height and footprint of the base 314a to be adjusted as needed. Legs 314d may be interconnected and reinforced by brace members 314f. Similar to the previous embodiments, the connection between the turbine blade assembly and the supporting structure for the wheel is gearless.

Turbine blade assembly 322 may be of similar construction to turbine blade 222 and, therefore, reference is made to the previous embodiment for details of the wheel 250 and blades 226 mounted to wheel 250. However, in the illustrated embodiment, magnets 330 are mounted to wheel 250 with a perpendicular orientation to the rotational plane of wheel 250 so that their major surfaces extend in a generally horizontal direction. Magnets 330 extend into a stator coil assembly 332, which has a similar construction to stator assembly 232 with exception of its orientation, which is rotated 90 degrees relative to the orientation of stator coil assembly 232 shown in the previous embodiment. In this manner, when wheel 350 experiences some wobble, the magnets will move generally parallel to the coils in the stator assembly and will generally maintain their gaps with the respective coils.

Figure 21:
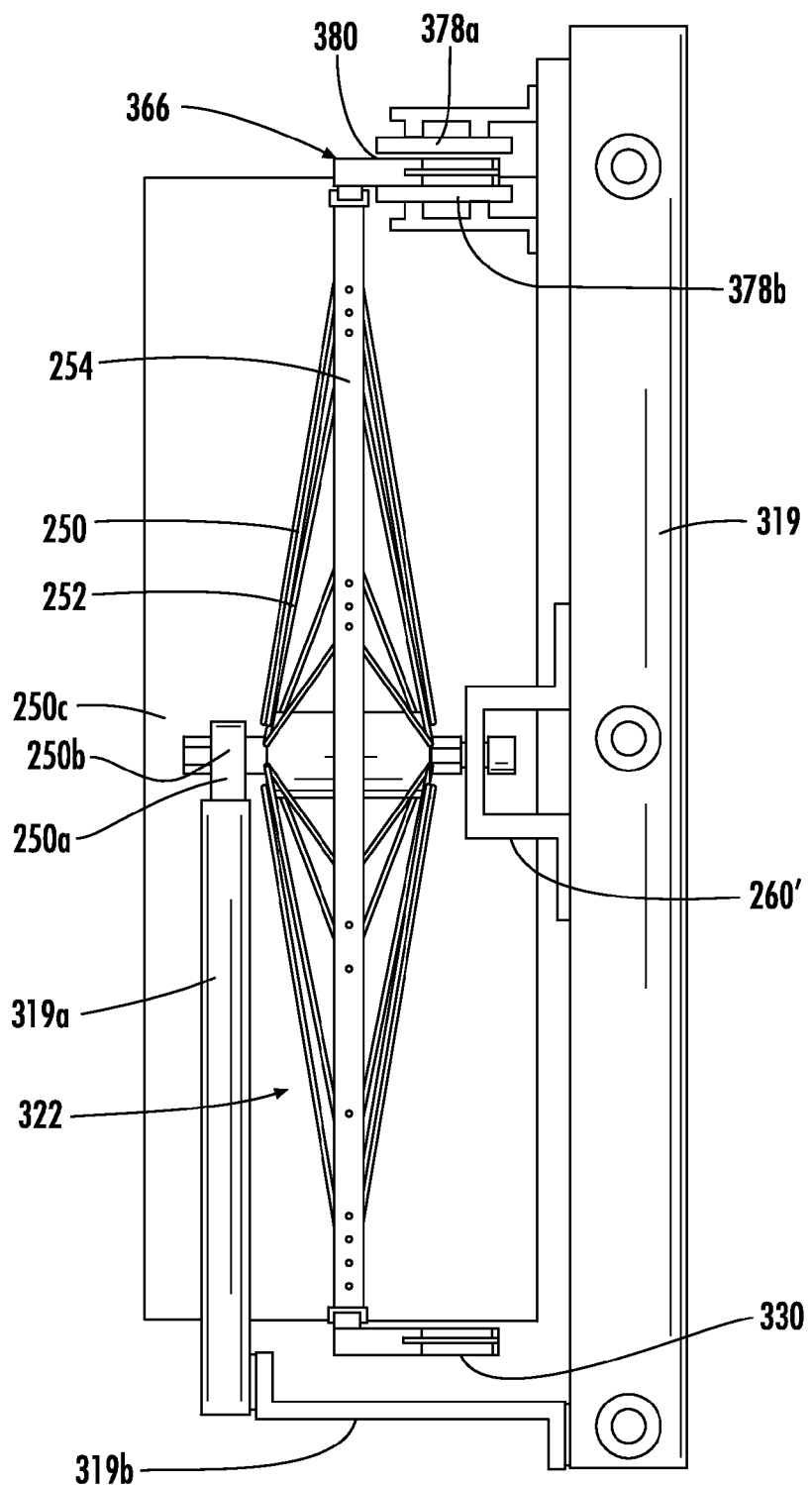
FIG. 21 is an enlarged view of the turbine wheel and magnet mounting arrangements.
Figure 22:
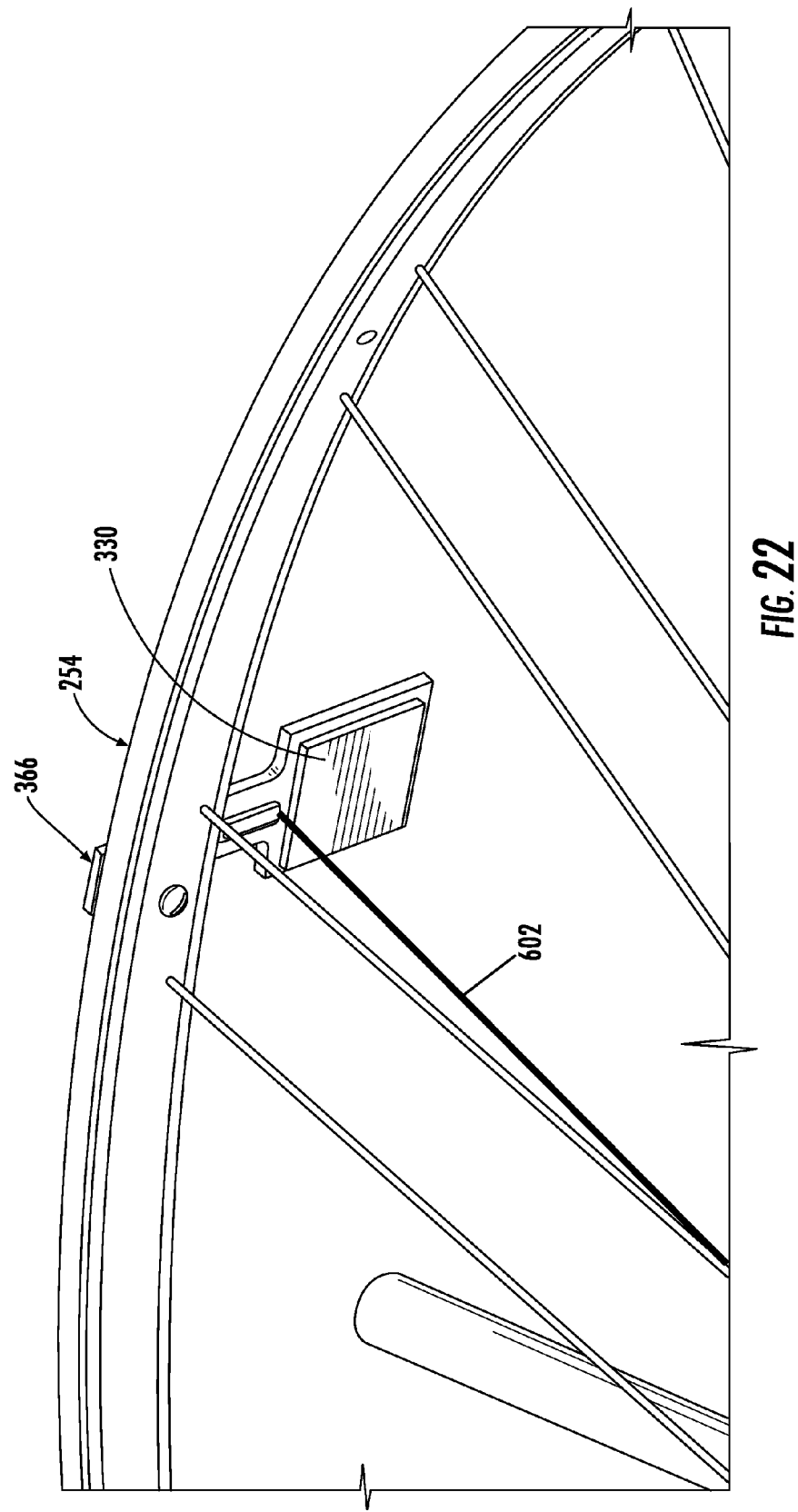
FIG. 22 is an enlarged view of the magnet mounting arrangement.
Figure 23:
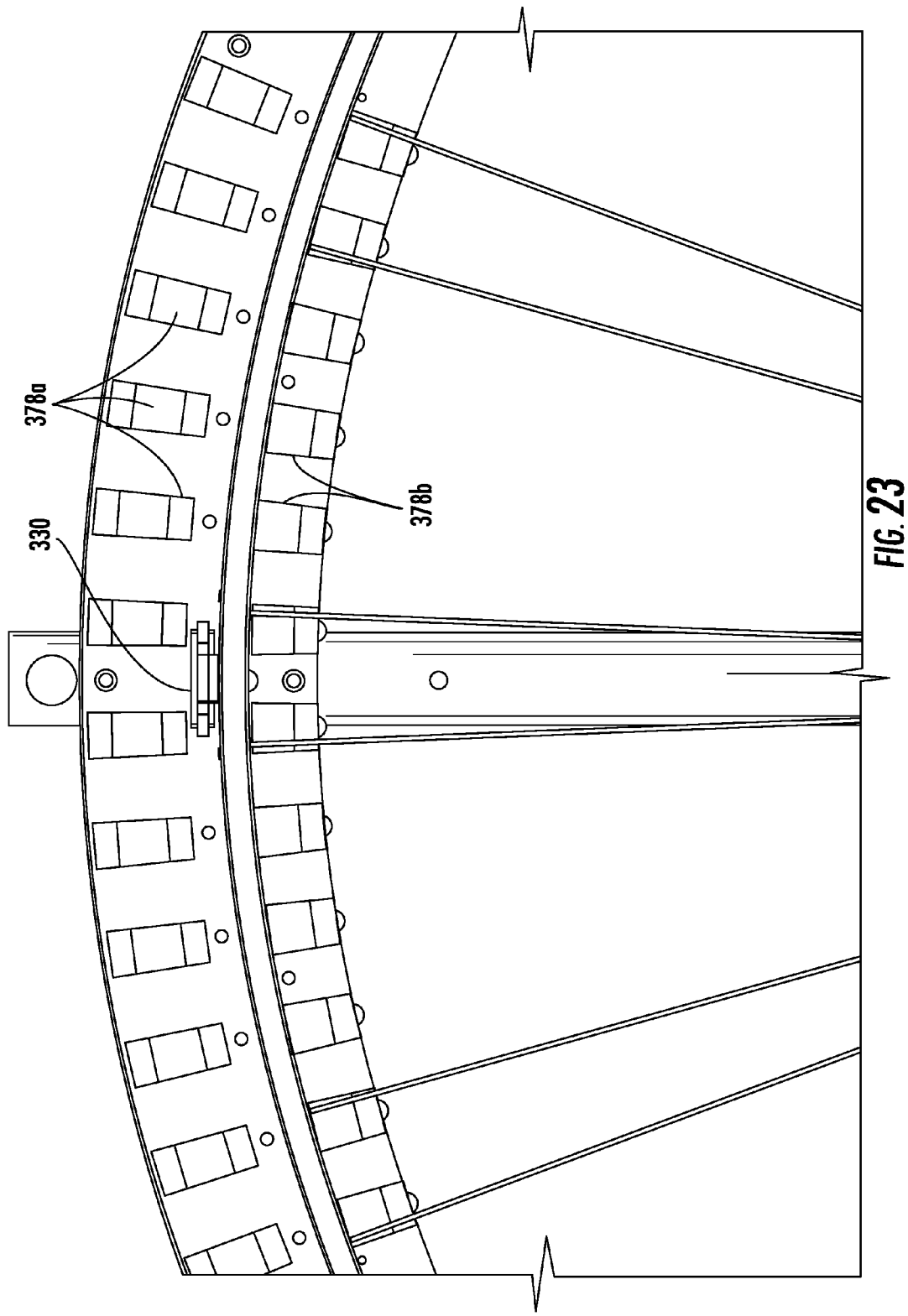
FIG. 23 is an enlarged partial view of the turbine blade wheel of FIG. 21 illustrating the magnets and stator mounting arrangements.

Referring to FIG. 20, stator coil assembly 332 is similarly mounted at the twelve-o'clock position and, further, may extend over an arcuate portion of the circumference of wheel 250 in a range of about 30 degrees to 45 degrees (or may extend around the full circumference of the wheel) and is mounted to orient the gap 380 between the respective stator coils 378a and 378b in a generally horizontal arrangement to thereby receive magnets 330 in their respective horizontal orientation as shown in FIGS. 20 and 21. Magnets 330 are also mounted to rim 254 of wheel 250 by brackets 366 and pins 366a, which support magnets 330 as noted above, but in a perpendicular arrangement relative to the rotational plane of wheel 250 (FIG. 22). Similar to the previous embodiment, shaft 250b of wheel 250 is rotationally mounted to post 319 by a bracket 260' and, further, by an additional support arm 319a, which is mounted to post 319 by a bracket 319b, as best seen in FIG. 21. In this manner, both ends of the rotational shaft 250b are supported. In the illustrated embodiment, bracket 260' comprises a flanged channel-shape member that mounts to post 319 by fasteners that extend through its flanges.

Referring to FIGS. 26 and 27, the numeral 410 generally designates another embodiment of the wind turbine assembly of the present invention. Similar to the previous embodiments, wind turbine 410 includes a frame 412 that supports a wind turbine blade assembly 422 on a base 414. Wind turbine blade assembly 422 includes a wheel 450 similar to wheel 250 to which turbine blades 426 are mounted. For further details of wheel 450 and turbine blades 426 reference is made to the previous embodiments. Frame 412 includes an annular member 418, which supports a plurality of stators coils 432 arranged around the circumference of wheel 450, which have a channel-shaped arrangement, as described in reference to the previous embodiments, to receive magnets mounted to the rim 454 of wheel 450. In this manner, as wheel 450 spins around its axis 450a, the magnets 430 mounted to rim 454 will induce electrical current flow in the stator coils similar to turbine 210.

Frame 412 is supported on base 414 by a post 419 and a semicircular frame member 414a, which mounts frame 412 to post 419. Frame member 414a is secured, for example, by fasteners 414b to medial transverse frame members 420a and 420b of frame 412. Transverse frame members 420a and 420b are joined at their opposed ends by transverse frame members 421a and 421b, which provide a mounting surface for semicircular frame member 414a. Shaft 450b of wheel 450 is then supported in transverse frame members 420a and 420b, for example in bushings. Again as noted above, the components forming the frame and the base may be metal, polymeric or composite components.

Optionally, turbine 410 includes an auxiliary set of turbine blades 526, which are mounted on blade arms 528, which are rotatably coupled to shaft 450b of wheel 450. In this manner, when wheel 450 rotates about its rotational axis 450a, blades 526 will rotate simultaneously with wheel 450. Blades 526, therefore, provide additional surface areas to increase the rotational speed of the wheel 450.

Optionally, post 419 may be rotatably mounted to base 415 and, further, rotated about base 414 by the wind. For example, a wind vane 480 may be mounted to frame 412 so that the wind will adjust the position of turbine 410.

Figure 28:
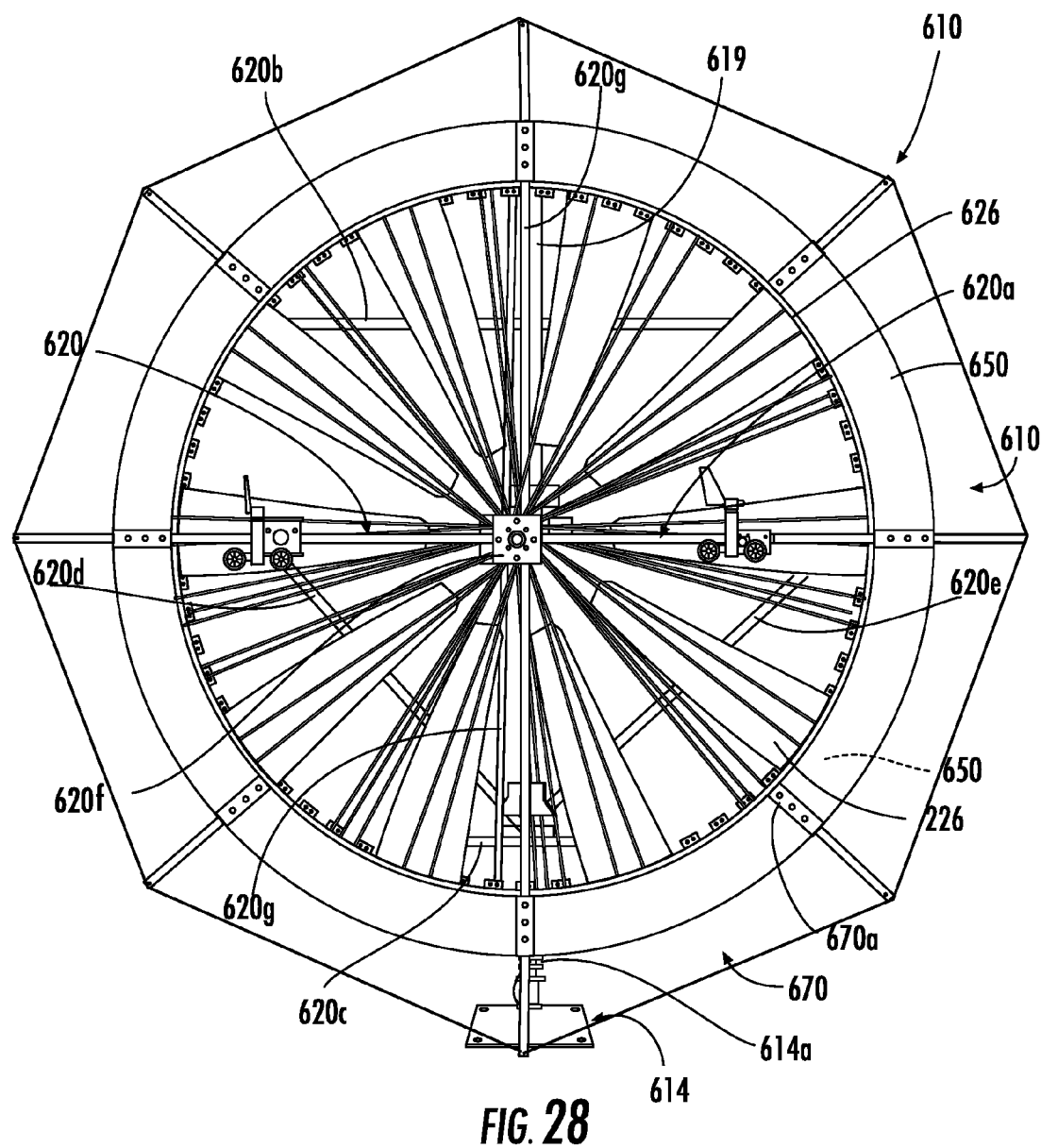
FIG. 28 is an elevation view of the another embodiment of the wind turbine of the present invention incorporating a wind concentrator mounted to the windward facing side of the wind turbine.

Referring to FIG. 28, the numeral 610 generally designates another embodiment of the wind turbine of the present invention. Turbine 610 includes wind turbine wheel 250 with a plurality of blades 626 mounted to wheel 250, a stator coil assembly 322, a base 614, and a cover 650. Base 614 is similar to base 214 of turbine 210, which allows the wind turbine wheel 250 along with its blades to change direction in response to the wind speed and direction, as described in reference to the previous embodiments.

In the illustrated embodiment, blades 626 are molded from a plastic, such as described in reference to blades 1226, and are similarly mounted to the spokes of the wheel by fasteners, such as clips. Also, similar to blades 1226, and as best seen in FIG. 28D, blades 626 may be mounted to the spokes using clips that allow for deflection of the blades in response to the wind speed exceeding a preselected threshold. The longitudinal edge of each blade may be secured by multiple clips to one spoke, while the other longitudinal edge may be unrestrained but with the distal end of the blade (at the end of the unrestrained longitudinal edge) may be mounted by a clip to an adjacent spoke, which accommodates the asymmetrical shape of the blade. Thus, each of the blades' distal edges (see e.g. FIG. 28D) are therefore connected to the wheel by at least two clips (one at the end of the restrained longitudinal edge and the other at the unrestrained longitudinal edge) but decoupled from the rim. In this a manner, there is a gap between the distal edge of each blade and the rim of the wheel, leaving the blades with several degrees of freedom at their distal ends (as well as along their unrestrained longitudinal edges) so that the blades are allowed to flex or bend under high wind speeds. For further details of the wheel and the blades, reference is made to the previous embodiment.

Figure 28A:
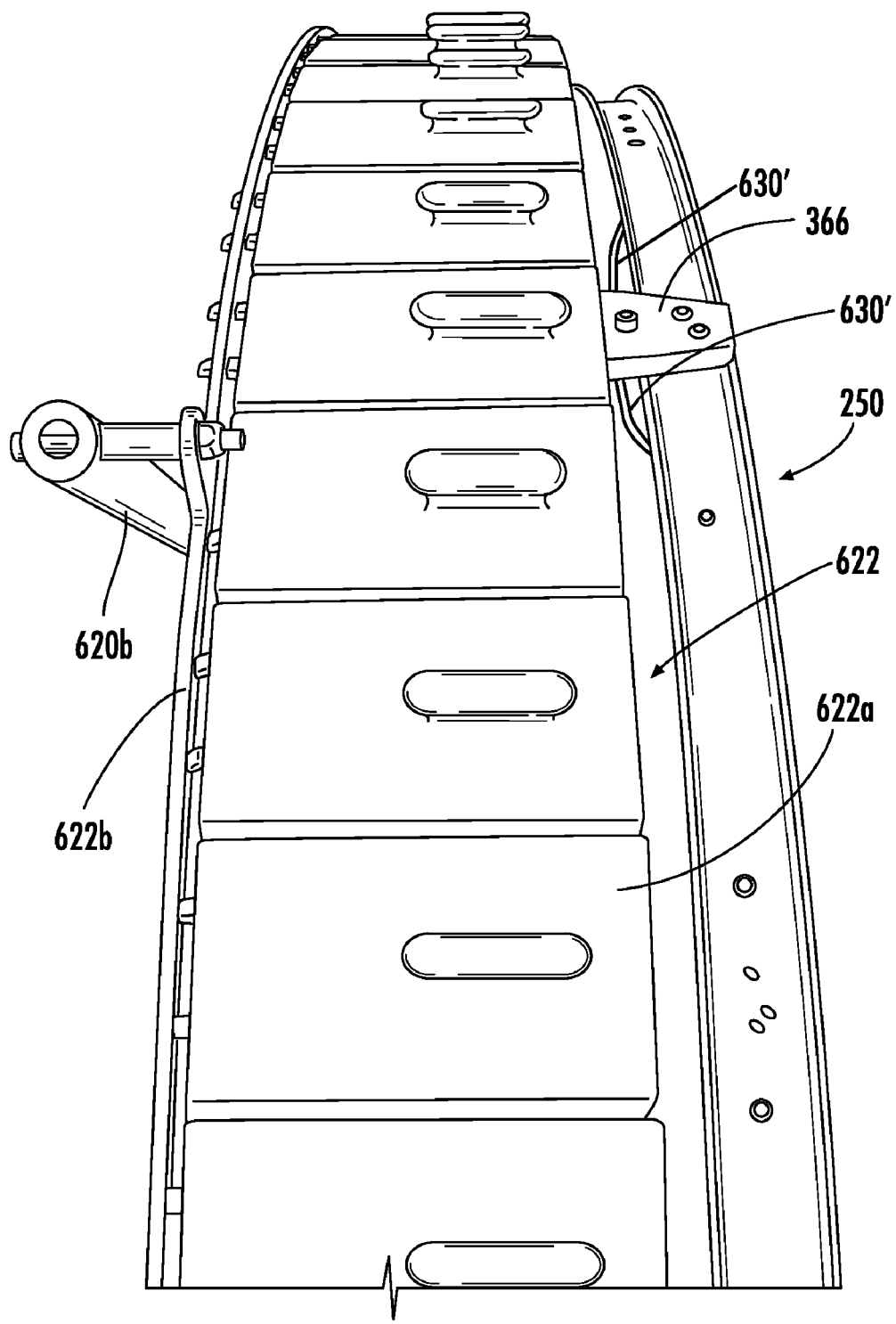
FIG. 28A is an enlarged fragmentary view of the stator coil assembly and magnet mounting details to the turbine wheel.
Figure 28B:
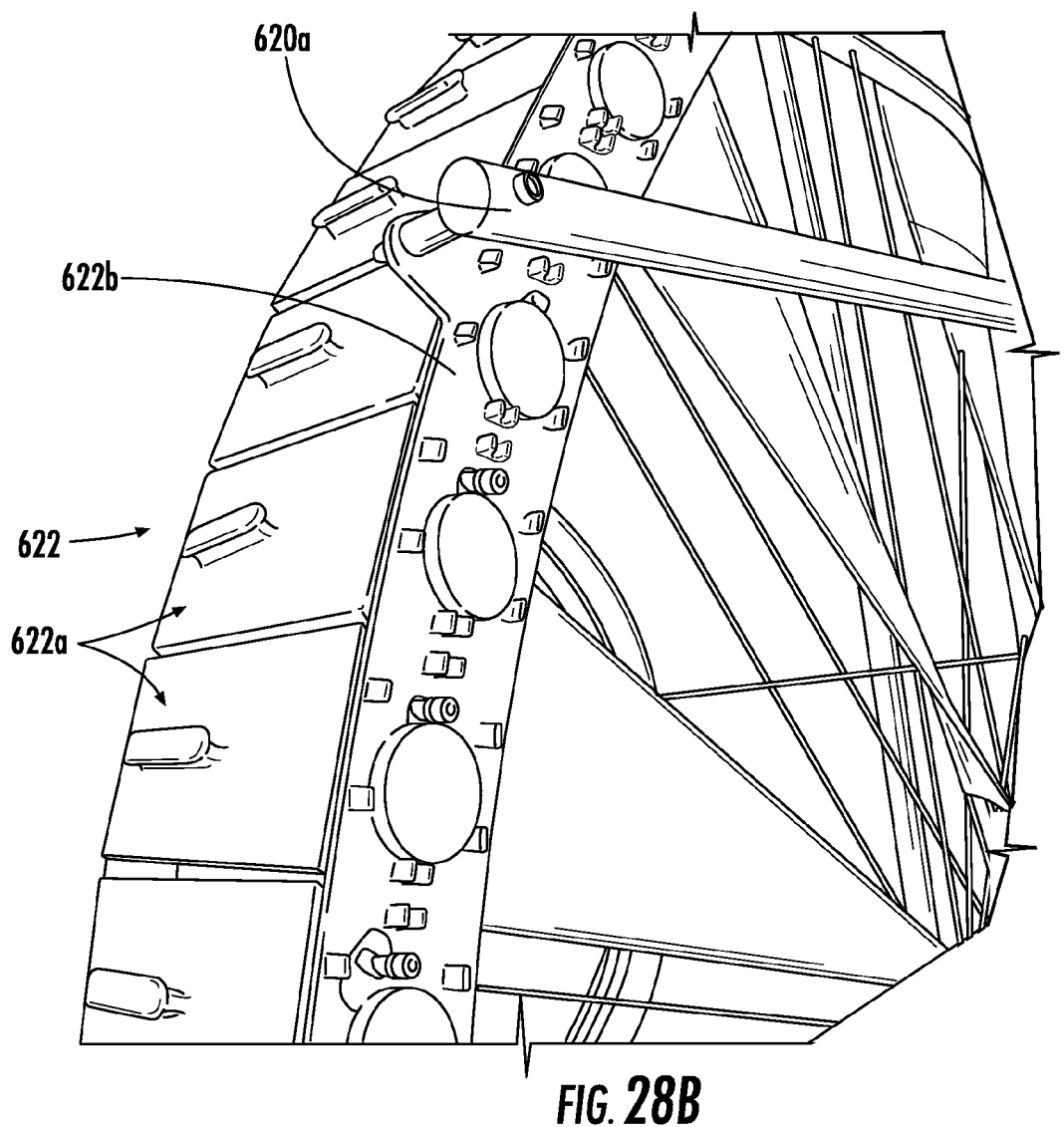
FIG. 28B is another enlarged fragmentary view of the stator coil assembly and mounting details.

Like turbine 310, however, turbine 610 mounts its magnets so that they extend outwardly from wheel 250 in a direction angled to the plane of rotation of wheel 250 (see FIGS. 28A, 29, 29A, and 29B) and into stator assembly 622 (FIGS. 28A and 28B). Stator assembly 622 is of similar construction to stator assembly 322 and is oriented so that its channel is in a horizontal plane to receive the generally horizontally arranged magnets.

Similar to the previous embodiments, wheel 250 is mounted to a post 619 (FIG. 28D) on shaft 250b by a bracket 660 (similar to bracket 260'). Mounted to post 619 is a plurality of transverse frame members or rods 620a, 620b, 620c, which together mount stator assembly 622 to post 619. Optionally, transverse support member 660a may be braced by diagonal support members 620d and 620e. Post 619 and members 620a, 620b, 620c, 620d, and 620e may all be formed from metal components, including aluminum or stainless steel members, including aluminum or stainless steel tubular members.

As best seen in FIG. 28B, stator assembly 622 includes a plurality of stator sub-assemblies 622a that are mounted on a non-conductive plate 622b, which mounts stator assembly 622 to transverse support members 620a, 620b, and 620c with fasteners (see e.g. FIG. 28B).

Similarly, the leeward side (the side facing the direction in which the wind is blowing) of cover 650 may be mounted to the transverse support members 660a, 660b, and 660c by fasteners or brackets (not shown). The windward side of cover 650 is mounted to a frame 620, which supports the opposed end of shaft 250b in a central frame member 620f. Extending outwardly from central frame member 620f, which in the illustrated embodiment is in the form of a block, are radially extending frame members 620g, which in turn are coupled to cover 650. In this manner, post 619 supports wheel 250, stator assembly 322, and cover 650.

Referring again to FIG. 28D, post 619 is mounted to the upwardly extending post 614a of base 614 to provide a rotatable mount for wheel 250. Post 619 is rotatably mounted to post 614a by a bracket 619a and bushing (not shown) and further is optionally driven about post 614a by a driver 614c, which is driven by a controller to change the orientation of the wind turbine wheel, as described in the above referenced copending application. For further details of the controller and positioning of wind turbine wheel, reference is made to U.S. patent application Ser. No. 12/714,982, filed Mar. 1, 2010, by Imad Mahawili, Ph.D, entitled WIND TURBINE AND CONTROL SYSTEM, which is herein incorporated by reference in its entirety.

Referring to FIG. 28D, the inner end of each blade may be coupled to the inner end of its opposed blade, for example, by a rod, such as a metal rod, or wire member 600. Member 600 includes loop ends 600a for extending through openings formed in each respective blade and thereby engaging each respective blade. It should be understood that other suitable mounting methods may be used. Members 600 therefore tie opposed blades together to balance the centrifugal forces generated at the blades and reduce the stresses on the shaft. It should be understood that in any of the wind turbine described above, the blades on opposed sides from the hub may be tied together, for example, by the tie support, such as rod or wire member 600 (see e.g. FIG. 6), which is coupled on one end to one blade and then coupled at its opposite end to the other, opposing blade.

Further, because blades 226, 1226, 226', 426 are each configured so that their outer ends have a greater expanse than at their inner ends, the stresses at the rotational shaft may be further reduced. When this is combined with balancing of the centrifugal forces by way of members 600, the stress on the shafts of the respective turbines due to the centrifugal forces normally generated at a wind turbines blades can be drastically reduced, if not effectively eliminated.

Optionally, the tie supports may be formed from a material that can extend or stretch to allow the blades to compress as described above in reference to the blades with the bifurcated webs, while still balancing the centrifugal forces. For example, the tie supports may be made from an elastomeric material or incorporated a spring, such as a spring integrated into or formed in the rod or wire, for example.

Figure 24:
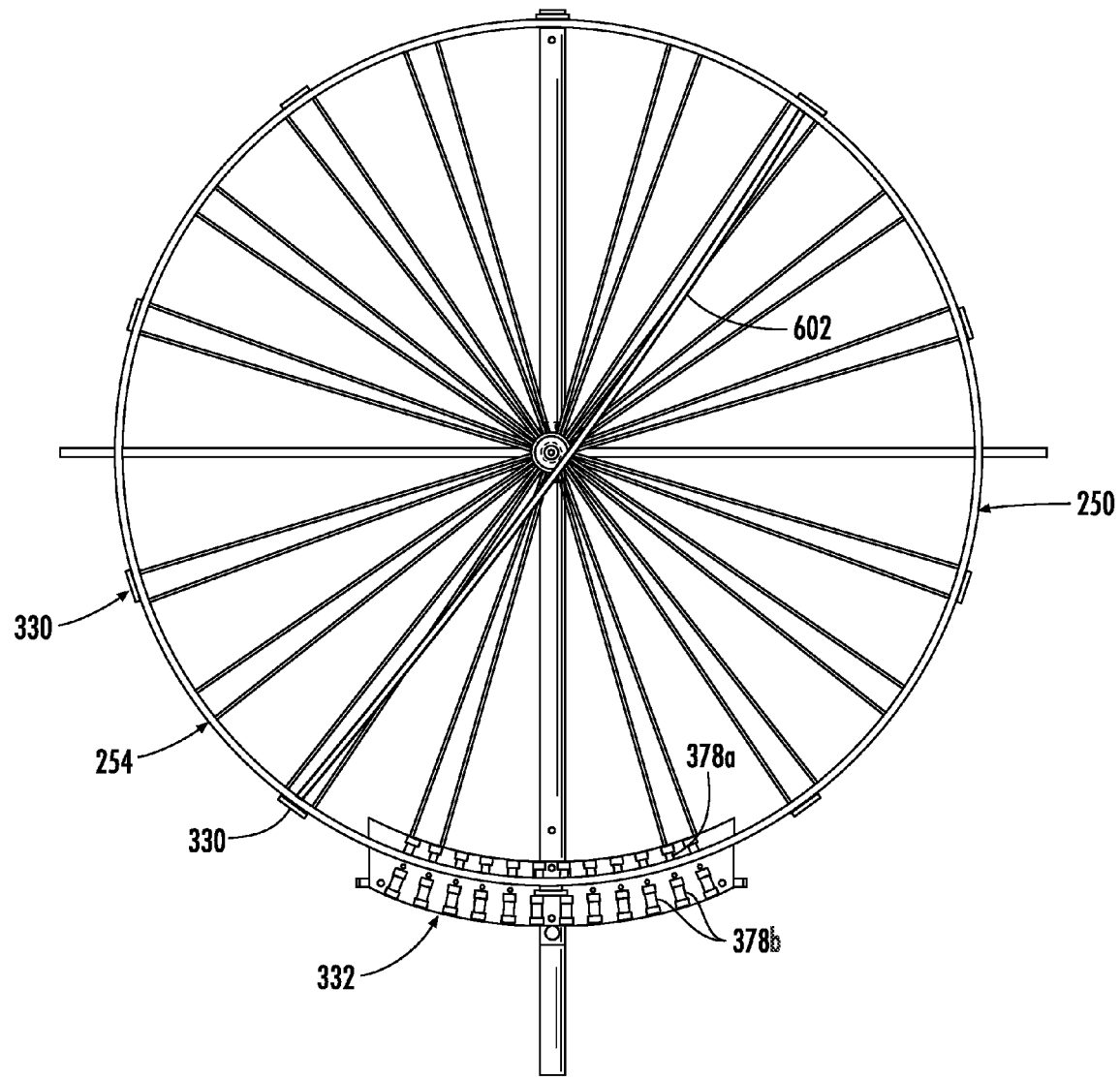
FIG. 24 is an enlarged view of the another embodiment of the wheel and stator mounting arrangement.
Figure 25:
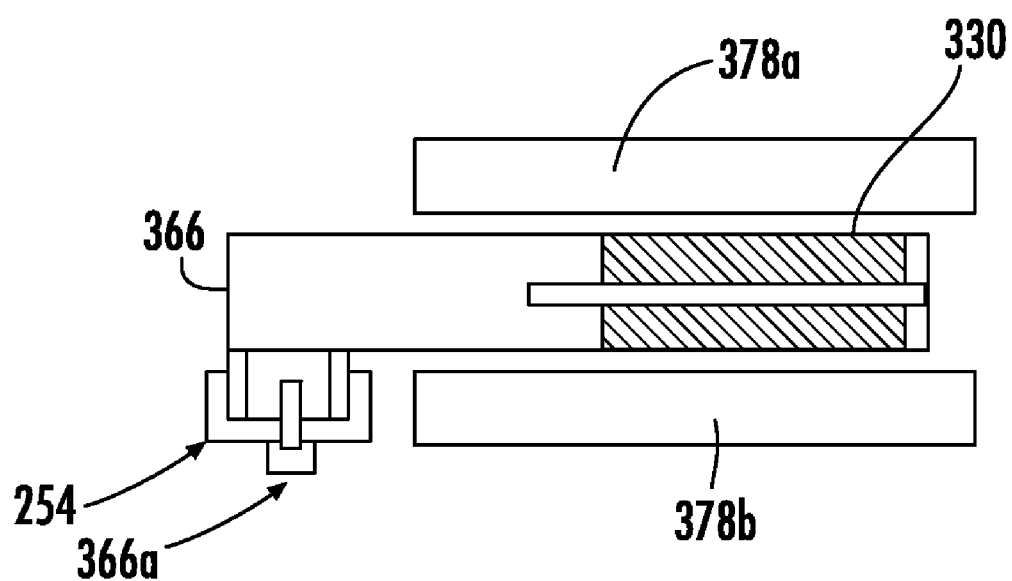
FIG. 25 is an enlarged view of the stator coil and magnet mounting details.

In addition to balancing the centrifugal forces on the blades, wind turbine 610 may also balance the centrifugal forces on the magnets. For example, in the embodiment where the magnets are orthogonally oriented in relation to the rotational plane of the wheel, additional rods 602 (FIGS. 22 and 24) may be extended through the wheel, with their distal ends, e.g. threaded distal ends, anchored in the magnet mounting brackets of opposed magnets (see FIG. 24) by for example nuts. Alternatively, the ends of the rods may be welded to the respective brackets or formed with the respective brackets.

Figure 29:
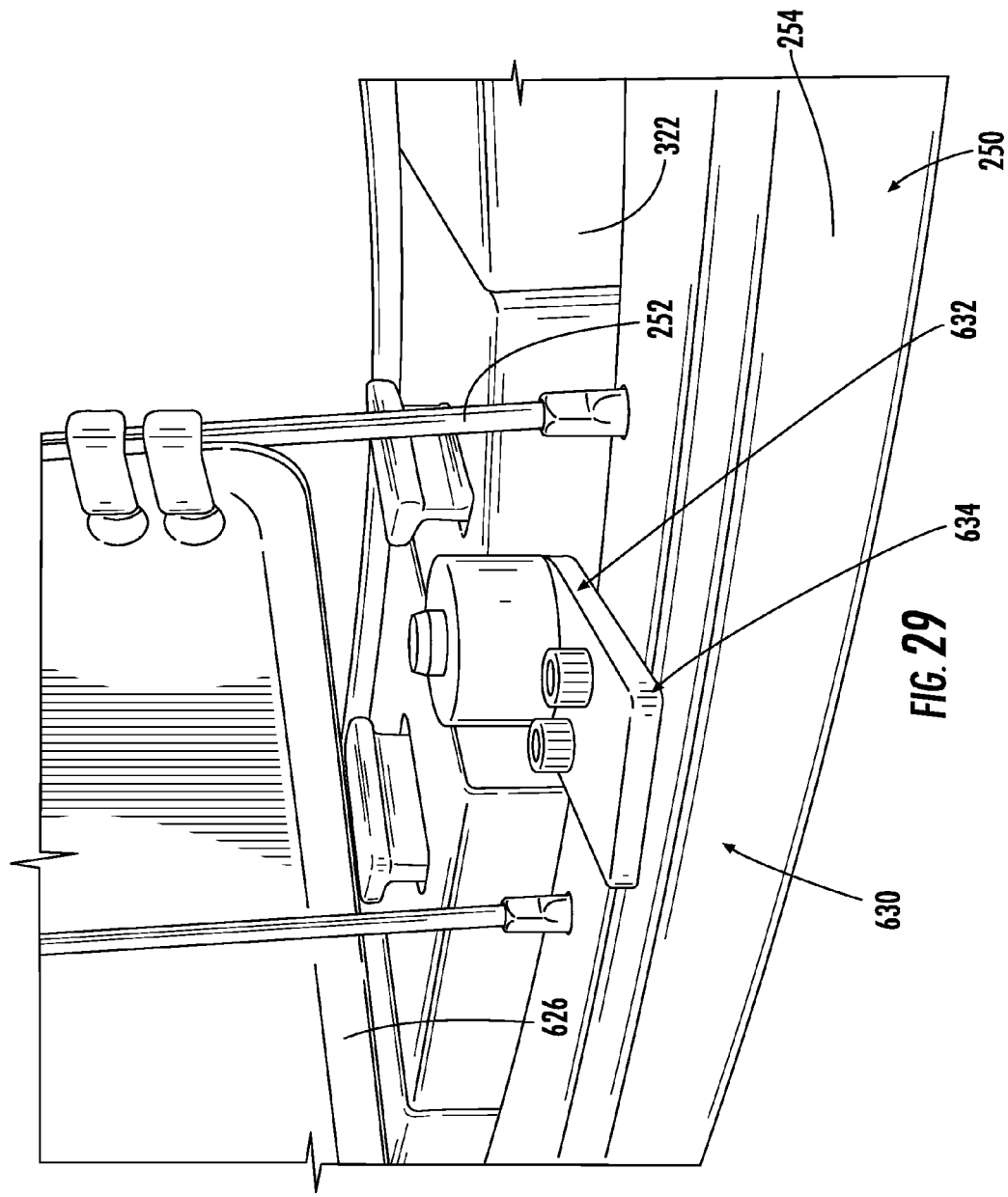
FIG. 29 is an enlarged fragmentary view illustrating a lateral support or guide for the turbine wheel.

As best understood from FIG. 29, each of the respective wind turbines may incorporate a guide that provides lateral support to the wheel or frame to reduce vibration or wobbling, to thereby reduce the wear and tear on the components. In the illustrated embodiments, each wheel may include two or more bearings 630 in the form of rollers 632, such as polymeric rollers, that are mounted to the wheel or frame for bearing on the stator housing. In the illustrated embodiment (in which magnets are mounted perpendicular to the rotational plane of the wheel) rollers 632 are mounted to the rim of the wheel by a bracket 634 and are mounted so that they extend inwardly for bearing on the outer annular facing of the stator housing. In this manner, as the wheel is rotated about its rotational axis on its shaft, the wheel is provided at least some lateral support at its outer perimeter, which may be particularly advantageous when the wind speed increases.

Figure 29A:
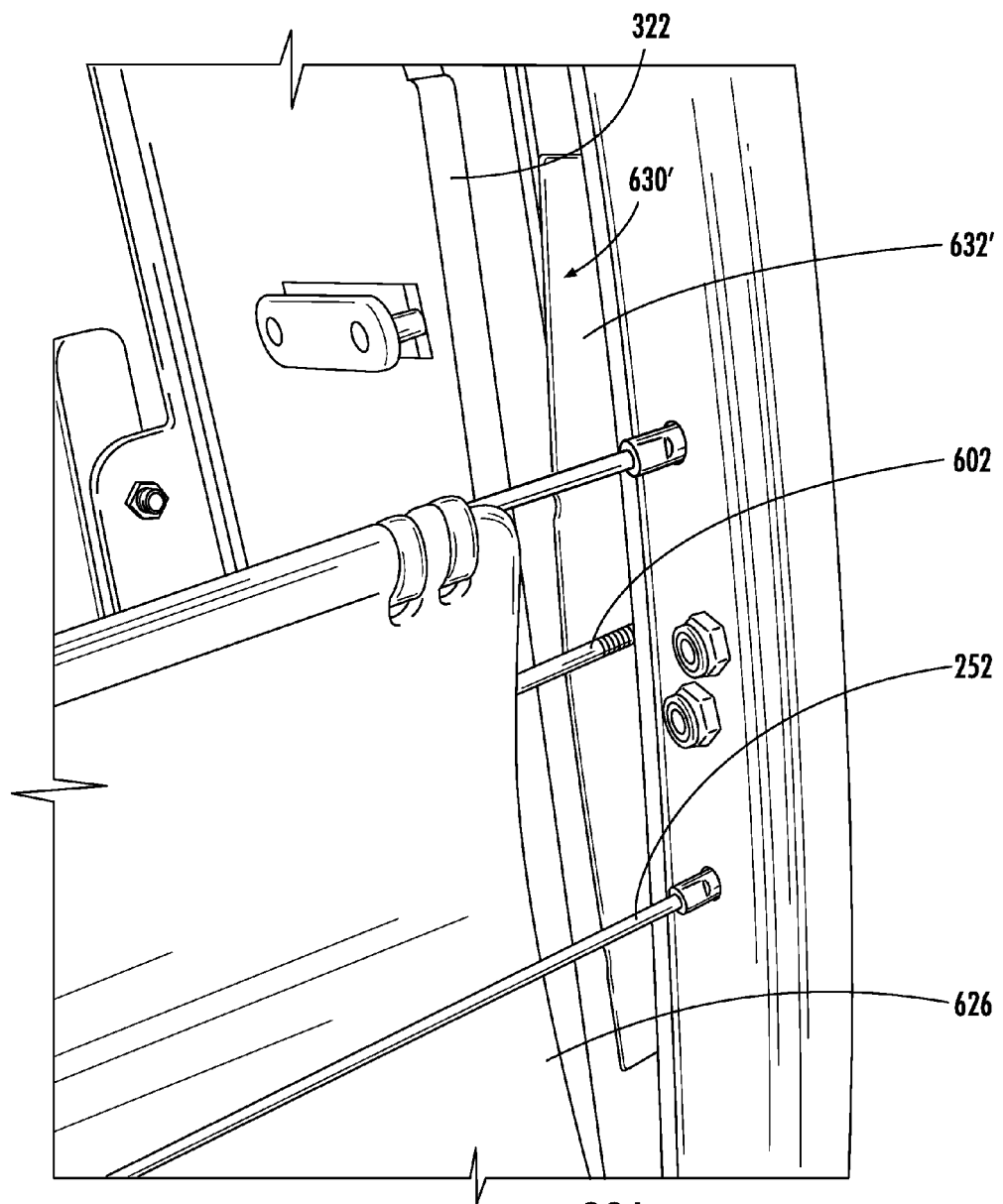
FIG. 29A is an enlarged front elevation view illustrating another embodiment of a lateral support or guide.
Figure 29B:
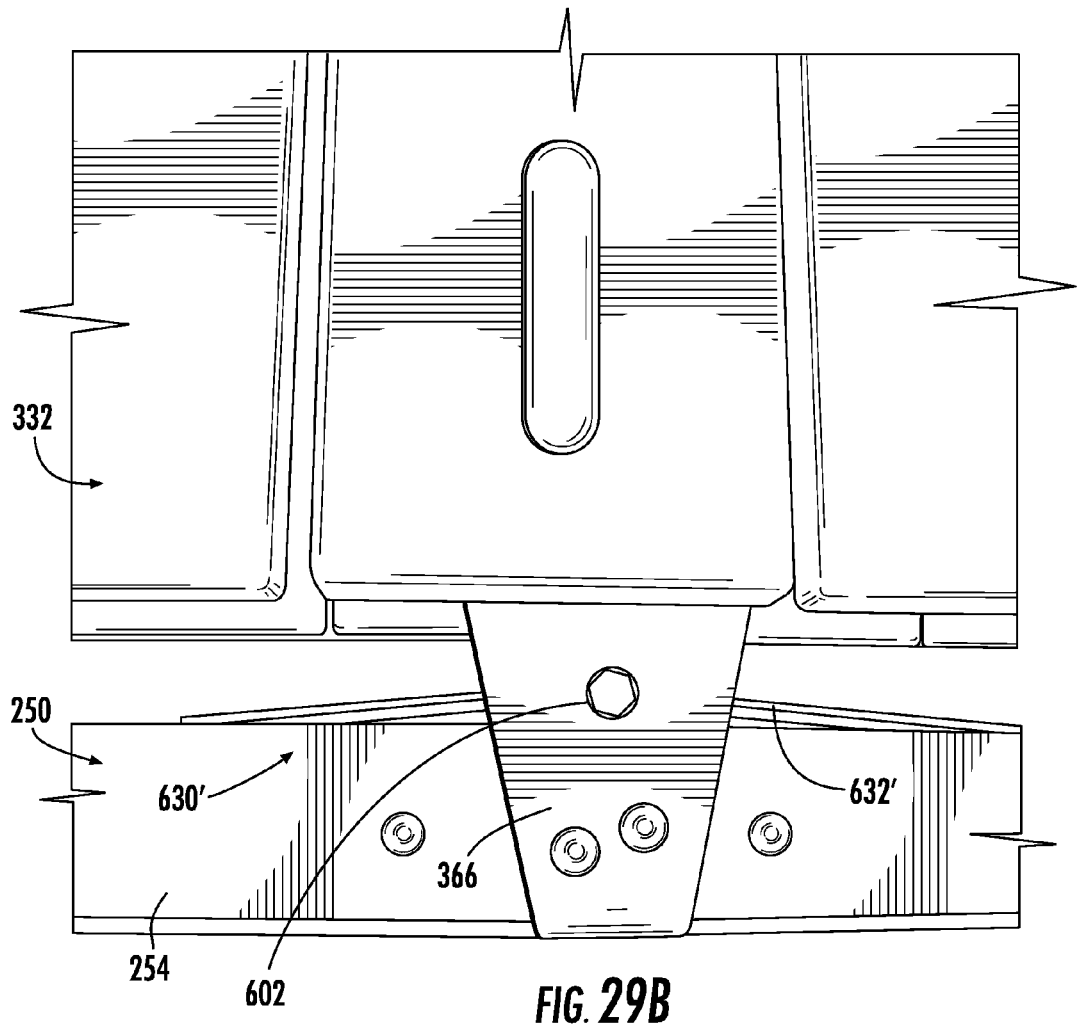
FIG. 29B is a rear elevation view of the lateral support or guide of FIG. 29A also illustrating the magnet mounting details to the turbine wheel.

Referring to FIGS. 29A and 29B, another embodiment of a guide 630' is illustrated. Guide 630' is formed from a plate 632, such as a metal or plastic plate. Plate 632 is also mounted to the rim of the wheel, for example, by fasteners or welds, and may be located adjacent each magnet mounting bracket and further such that they extend over the tie rods 602 that connect the opposed sets of magnet mounting brackets together. In this manner, plates 632 assume an arcuate or arched cross-section to provide a cam guide surface to help counteract any wobble in the wheels and help guide and maintain the turbine wheels in their rotational plane. Additional plates may also be located between the magnet locations.

Figure 30:
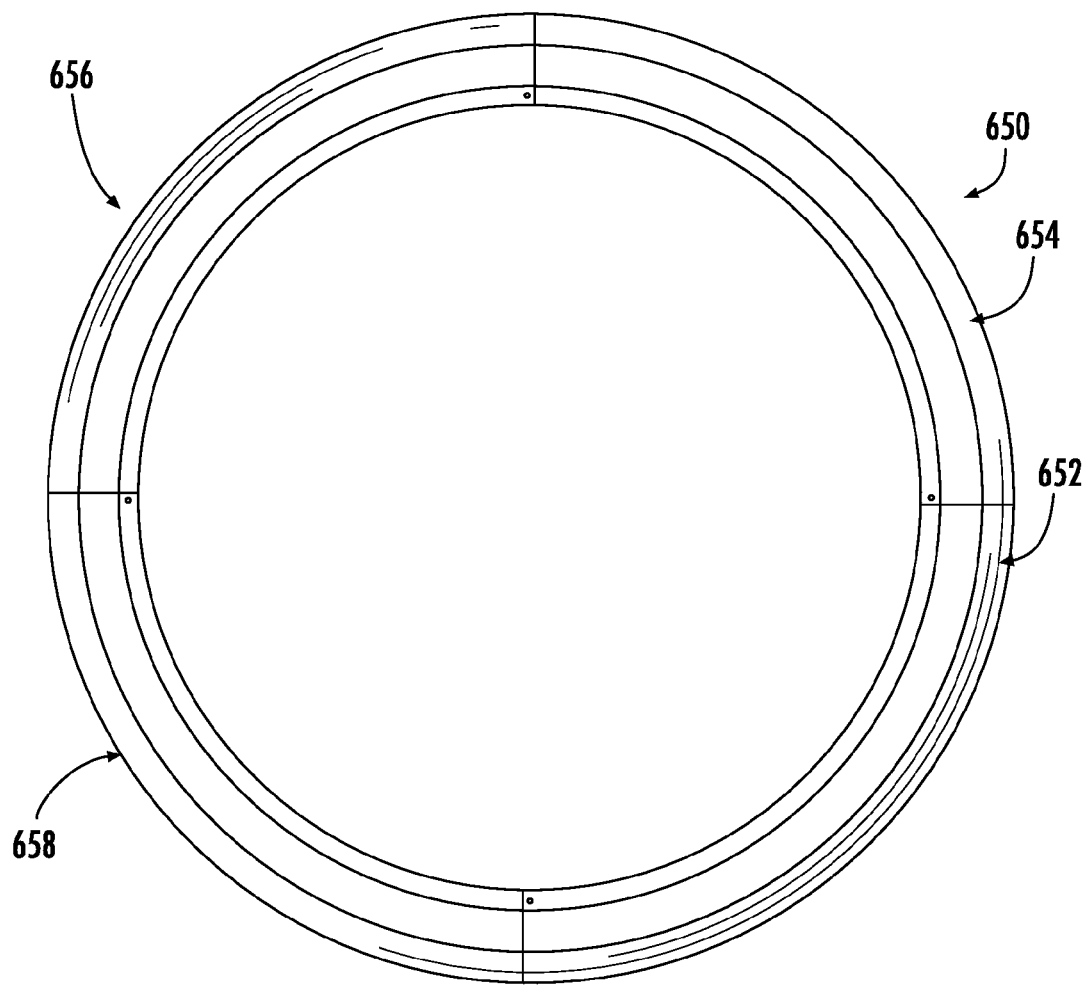
FIG. 30 is an elevation view of the cover of the wind turbine of FIG. 28.

Additionally, as noted in each of the wind turbines described herein, the stator assemblies may be enclosed in a cover. Referring to FIG. 30, cover 650, which may be mounted to any of the frames of the wind turbines described above, is adapted to converge the flow of air into the turbine blades and thereby further reduce the wind speed needed to operate the various wind turbines and also increase the efficiency of the wind turbine.

Figures 30A, 30B:
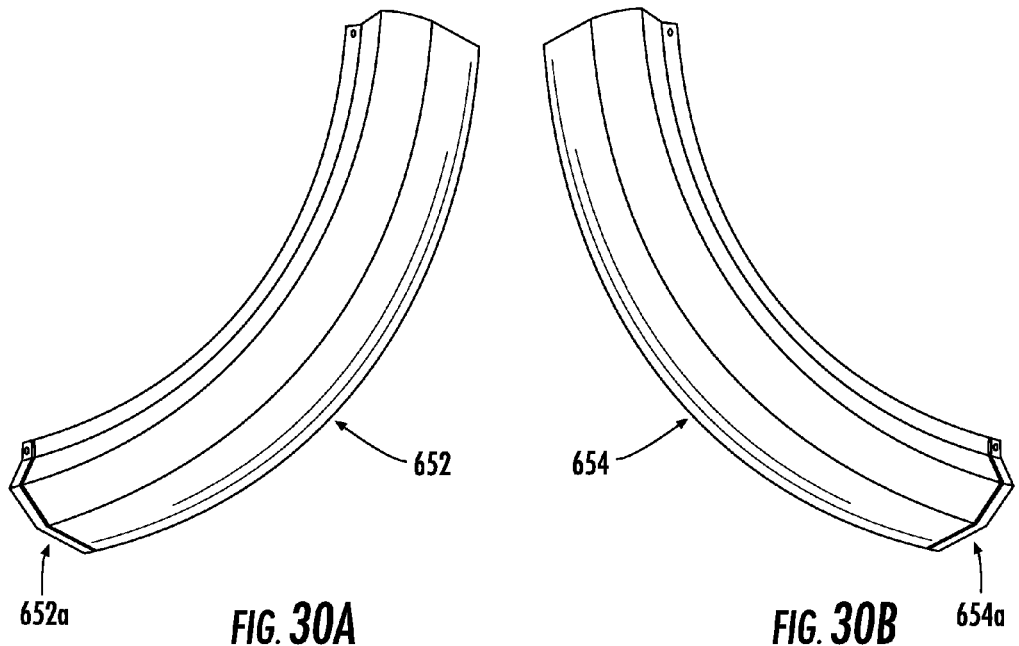
FIGS. 30A and 30B are perspective views of two sections of the cover of FIG. 30.

As best seen in FIGS. 30, 30A, and 30B, cover 650 may be formed from several arcuate members 652, 654, 656, and 658 that are connected together to form an annular cover. Cover 650 may be formed from metal or polymeric components, such as aluminum or stainless steel or plastic, and also optionally composite materials. Although described as being formed from several members, the cover may also be formed a single member. Members 652, 654, 656, and 658 are fastened together at their overlapping respective ends, for example, by fasteners. Referring to FIGS. 30A and 30B, one end of each member may include a mounting flange 652a, 654a which is overlapped by the other end of the adjacent member and secured thereto by fasteners or welds or the like.

Figure 30C:
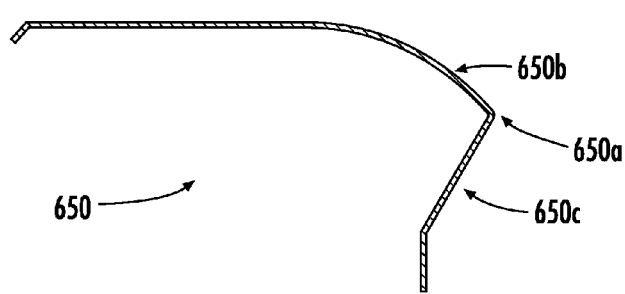
FIG. 30C is a cross-section view of the cover of FIG. 30.

Referring to FIG. 30C, each member 652, 654, 656, and 658 comprises a thin walled member with a cross-sectional profile that forms an annular diverging surface 650a for facing the wind (generally designated by the arrow in FIG. 30C). In addition, each member 652, 654, 656, and 658 includes an outer annular arcuate surface 650b which directs the outwardly redirected air flow across and around the cover. Inwardly of diverging surface 650a is an angled annular surface 650c, which directs the inwardly directed air flow into the blades to thereby converge the flow of air into the turbine blades.

Referring again to FIG. 28, optionally, any of the wind turbines of the present invention may incorporate an extension or wind concentrator, for example, to the cover that increases the windward facing side of the wind turbine and, which is adapted to increase the wind input into the wind turbine. While reference is made to turbine 610, it should be understood that the extension may be formed or mounted on any of the previous embodiments.

Figure 31:
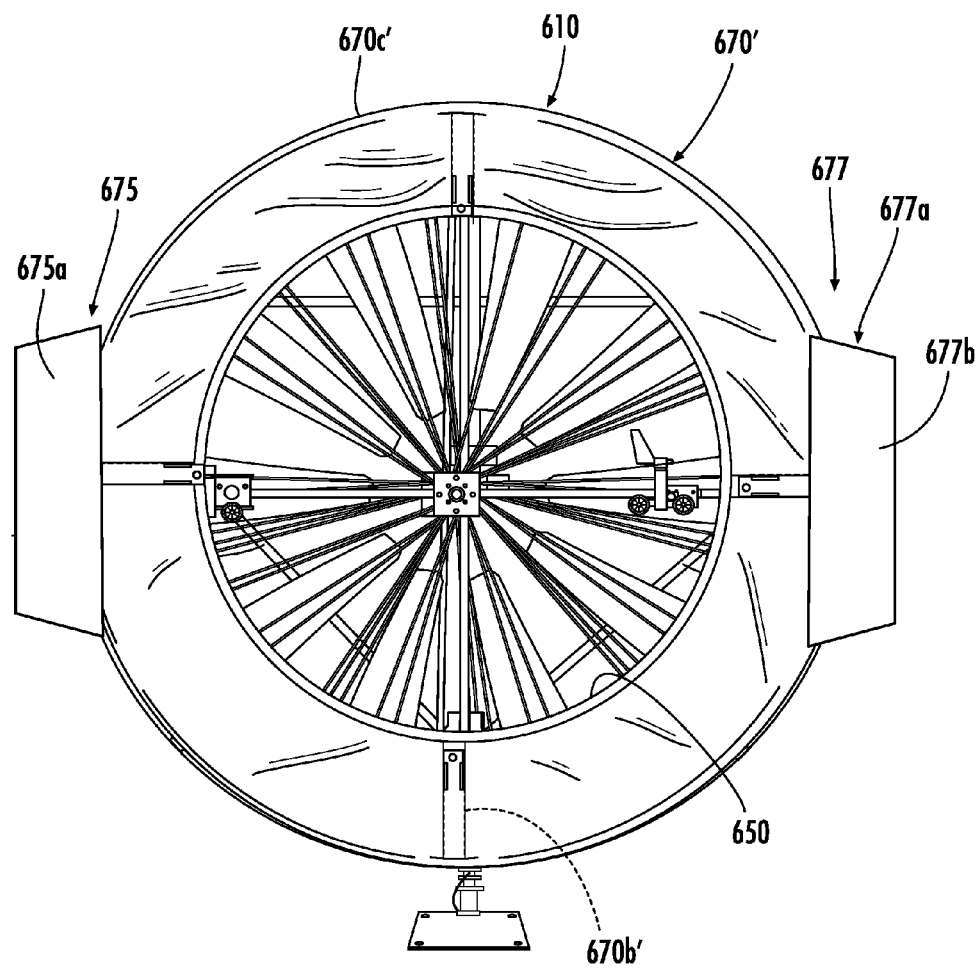
FIG. 31 is an elevation view of another embodiment of the wind concentrator mounted to the windward facing side of the wind turbine with optional stabilizers.

As best seen in FIGS. 28 and 28C, extension 670 has a generally frustoconical shape and is mounted to cover 650 at the cover's outer perimeter by a plurality of fasteners 670a to provide a conical surface extending radially outward from the tips of the turbine blades. Extension 670 may be formed from a flexible sheet material, such as plastic, a fabric (such as shown in FIG. 31), or the like, so that the extension is lightweight and, moreover, relatively easy to mount and further remove for easy transport. When formed from a flexible sheet, the sheet may be maintained in its generally frustoconical shape by support arms 670b which are mounted to cover 650 at spaced locations around the circumference of cover 650 by fasteners 670a.

As best seen in FIG. 28C, arms 670b optionally extend into pockets 670c formed or provided in the sheet and/or may be secured to the sheet for example by fasteners, such as snaps or the like, so that arms 670b are optionally removably mounted to the sheet. In this manner, the extension may be fully collapsible once removed and disassembled.

Extension 670 is angled so that extension 670 increases the collection surface of the wind turbine and, further, so that it directs the wind into the turbine wheel that would otherwise pass by the wind turbine. Further, it also helps to reduce the pressure at the blades, despite the high solidity provided by the blades. For example, extension 670 is angled outwardly from the cover as measured from the rotational axis of the turbine wheel at an angle in a range of 20° to 75°, more typically in a range of about 30° to 60°, and optionally at about 60°. When the turbine has a solidity of 30% or higher, the dynamic pressure at the blades tends to increase. Therefore, the wind speed tends to decrease. With the design of the cover and extension described above, the wind speed is increased as it approaches the wind turbine wheel, which reduces the pressure even with higher solidity. Further, at low wind speeds, the flow is accelerated in both directions (into the wind turbine wheel and around the outside of the cover). When the wind is accelerated into the wind turbine wheel, the pressure in the wind turbine wheel drops, which allows more air to be drawn into the wheel.

As noted above, the extension may be formed from a fabric, such as nylon coated polyester, such as shown in FIG. 31. Extender 670' is formed from a fabric and further includes additional extended portions 675 and 677, which may be formed from separate panels 675a and 677a that are mounted to extension 670' or are simply extended portions of the sheet forming the extension. Panels 675a and 677a may be formed from the same flexible sheet material as extender 670' and have a perimeter frame 675b and 677b, respectively, to support the flexible sheet material in its generally rectangular or trapezoidal shape and further provide a mounting surface for mounting the respective panels to the ends of arms 670b'. Panels 675a and 675b are angled rearward of the outer perimeter 670c' of extension 670' in the leeward direction (in the direction that the wind is flowing) to provide left and right wind force stability. For example, panels 675a and 677a may extend rearward at an angle as measured from the rotational axis of the turbine wheel in a range of 20° to 75°, typically in a range of 30° to 60°, and more typically at about 60° so that together, each panel forms an apex with the extension over a discrete angular segment of the extender, which again helps separate the wind. The panels may be flat or may be arcuate with a similar radius of curvature to the extension at their point of attachment, for example.

Figure 32:
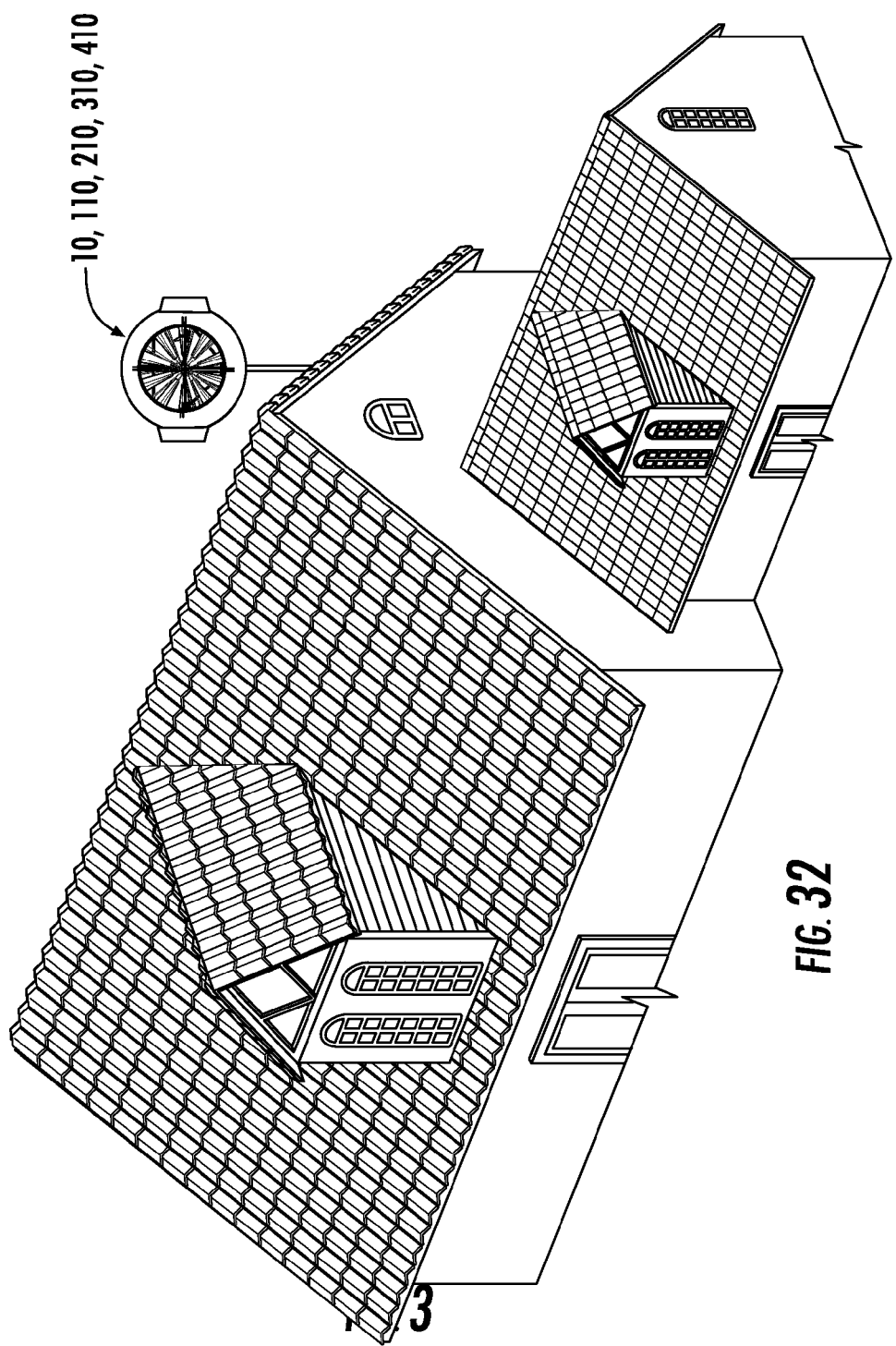
FIG. 32 is a schematic drawing of the wind turbine of the present invention mounted on top of a dwelling.

Referring to FIG. 32, any one of the wind turbines of the present invention 10, 110, 210, 310, 410, or 610 may be mounted to a structure, such as a house or garage or office building. For example, the wind turbines may be mounted to, for example a roof of the house and may provide power to the electrical system of the house, as described more fully in the referenced copending application.

Figure 33:
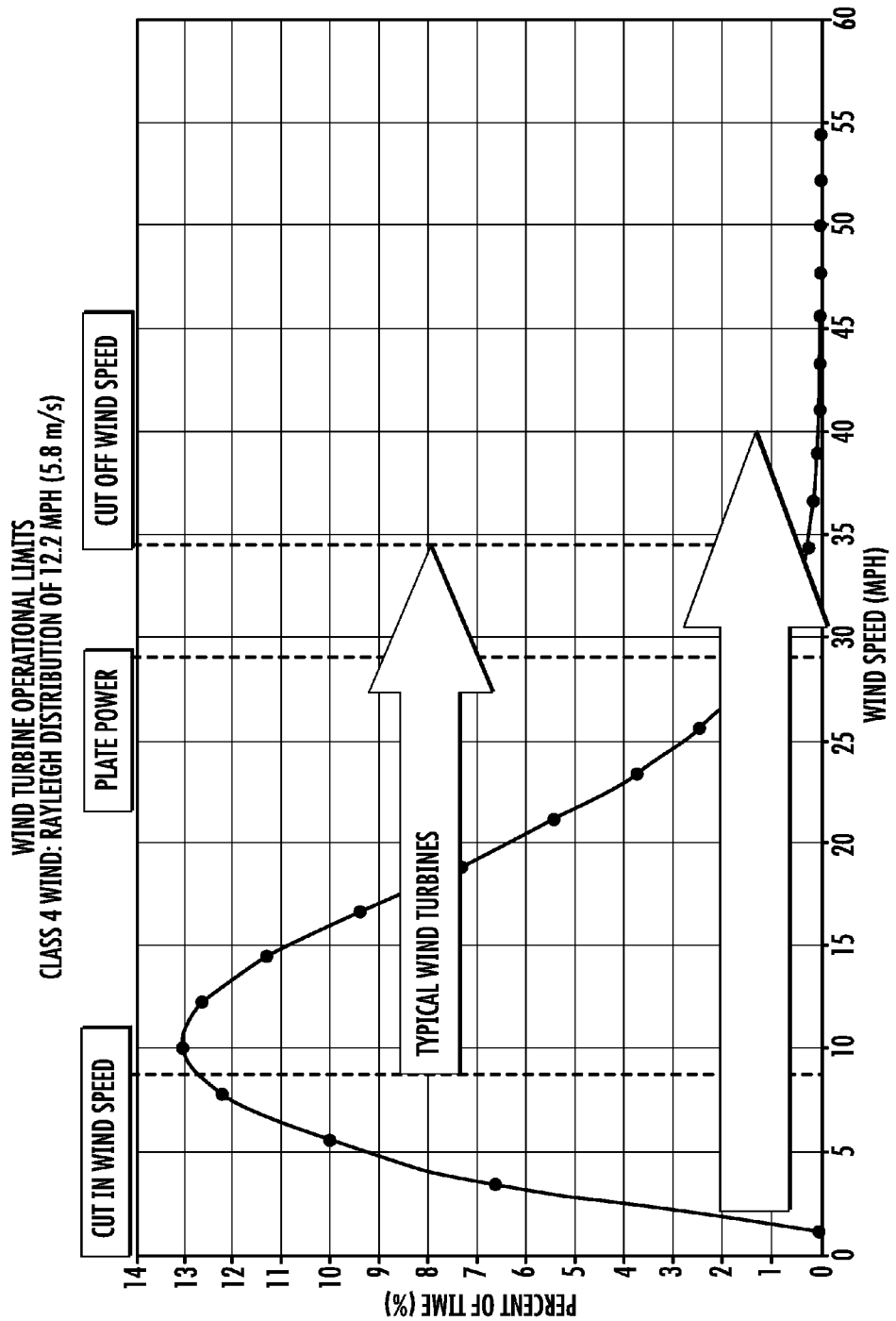
FIG. 33 is a chart illustrating a Class 4 wind distribution.

Referring to FIG. 33, a graph of a Class 4 wind Rayleigh distribution is provided, which illustrates the cut-in wind speed for most typical turbines, which is typically around 8 miles per hour. Further, the graph illustrates that the plate power, in other words the maximum capacity of the wind turbine of most conventional turbines, typically occurs at about 28 miles per hour. Further, most conventional wind turbines have a cut-off wind speed of about 34 to 35 miles per hour to reduce the chances of the turbine lift-offing and becoming airborn. In contrast, the present invention provides a wind turbine, which may operate at lower speeds and, further, which may have a cut-in speed of less then 8 miles per hour, less than 6 miles per hour, less than 4 mph, and optionally less than 1 mph and even as low as 0.3 miles per hour. In order to accommodate higher wind speeds, as described above, the turbines of the present inventions may have their respective turbine blades configured to self-adjust or self-configure to reduce the solidity of the turbine at higher wind speeds to thereby eliminate the chance of the turbine lifting off when subject to high wind speeds. In cases where the solidity of the turbine blades is fixed, the control system may slow and/or adjust the orientation of the wind turbine. For example, at wind speeds of 40 mph the control system optionally shunts the turbine with high powered resistance to stop the turbine from going too fast—and further rotates the wind turbine so that it is, for example, parallel to wind. As described in the copending application, a microprocessor-based control system may be provided to control the direction of the turbine to reduce the stress on the wind turbine or to optimize the direction of the turbine so that the angle of receipt of the wind can be maintained at for example 120 degrees relative to the face of the turbine. Furthermore, with the present construction, the turbine may be oriented to receive wind from its front facing direction as well as its rearward direction so that it is bidirectional.

While several forms of the invention have been shown and described, other forms will now be apparent to those skilled in the art. For example, optionally, to increase power output, in addition to providing coils on both sides of the magnets and further making their inductive current flow additive, the magnets size may be increased. For example, the thickness of the magnets may be increased from ½ inch, as noted, to 0.7 inches, to 0.8 inches, or 1 inch thick. Further, to increase efficiency, the gap between the magnets can be reduced. For example, the total gap (for example, in the case of the horizontal magnets, the gap above and the gap below the magnet) may be in a range of $5/1000$ inch to $40/1000$ inch. When the magnets are arranged in a horizontal arrangement and therefore extend in the direction of the wheel wobble, any wobbling motion will not significantly impact the gaps between the magnets and the stator assembly. Further, as noted above, this wobbling motion may be reduced with the addition of the rollers or cover plates described above. It also should be understood than any feature or features of one turbine may be incorporated in the other turbines described herein, and further may be may incorporated in other conventional turbines.

It should be understood that the embodiments shown in the drawings and described above are merely for illustrative purposes, and are not intended to limit the scope of the invention which is defined by the claims which follow as interpreted under the principles of patent law including the doctrine of equivalents.

The embodiments of the invention in which I claim an exclusive property right or privilege are defined as follows:

1. A wind turbine comprising:
   a support;
   a rotating frame having a central axis of rotation supported by said support for rotation about said central axis, said rotating frame having a rim and a plurality of radially extending arms;
   a plurality of wind turbine blades mounted to and supported by said arms of said rotating frame, each of said blades having a blade tip and a blade tip speed;
   a magnet having a magnetic flux supported by said rim of said rotating frame and spaced outwardly from said central axis of rotation and having an angular velocity approximately equal to or greater than the blade tip speed of said blades, said magnet being mounted to said rim of said rotating frame independent of said blades in a manner such that the weight of said magnet is not borne by said blades and instead is borne by said rotating frame; and
   a conductive circuit, said circuit being sufficiently close to said magnet wherein the magnetic flux of said magnet induces current flow in said circuit when said magnet is moved by said circuit.

2. The wind turbine according to claim 1, wherein said magnet has a pair of opposed facing sides, each side having a magnetic flux, and said circuit includes a pair of coils, said coils straddling said magnet, each of said coils being adjacent a respective side of said magnet wherein the magnetic flux of each side of said magnet induces current flow in said circuit.

3. The wind turbine according to claim 2, wherein said circuit is configured so that current flow in said pair of coils is additive.

4. The wind turbine according to claim 1, wherein said rotating frame comprises a central hub and said arms comprising a plurality of spokes extending from said hub, said turbine blades being mounted to said spokes.

5. The wind turbine according to claim 1, wherein each of said blades comprises a flexible membrane, each membrane having an inner side and an outer side, each outer side forming a windward facing side of a respective blade and each inner side forming a leeward side of said respective blade.

6. A wind turbine comprising:
   a plurality of wind turbine blades mounted for rotation about an axis of rotation, each of said blades having a proximal end, a distal end, a first longitudinal edge extending from said proximal end to said distal end, and a second longitudinal edge extending from said distal end to said proximal end;
   a hub;
   a plurality of spokes;
   an annular rim supported by said spokes and extending around said distal ends of said turbine blades;
   a magnet supported by said rim, each of said first longitudinal edges mounted to a respective spoke, each of said distal ends of said blades being decoupled from said rim wherein the weight of the magnet is not borne by said blades, said magnet having an angular velocity of at least the maximum angular velocity of said blades, and said magnet having a pair of opposed facing sides, each side having a magnetic flux; and
   a conductive circuit, said circuit being sufficiently close to said pair of opposed facing sides of said magnet wherein the magnetic flux of both sides of said magnet induces current flow in said circuit when said magnet is moved past said circuit.

7. The wind turbine according to claim 6, wherein said magnet comprises a plurality of magnets, said plurality of magnets being supported by said rim.

8. The wind turbine according to claim 6, wherein each of said turbine blades comprises a flexible membrane, each membrane having an inner side and an outer side, each outer side forming a windward facing side of a respective blade and said inner side forming a leeward side of said respective blade.

9. The turbine according to claim 8, wherein each of said turbine blades includes a frame, said flexible membranes mounted to said frames.

10. The turbine according to claim 8, wherein said flexible membrane comprise a fabric sheet or a polymer sheet.

11. The turbine according to claim 6, wherein at least one of said turbine blades is configured to adjust its solidity.

12. A wind turbine comprising:
    a support;
    a rotating frame having a central axis of rotation supported by said support for rotation about said central axis, said rotating frame having a rim and a plurality of radially extending arms;
    a plurality of wind turbine blades mounted to and supported by said arms of said rotating frame, each of said blades, comprising a solid cross-section formed from a flexible membrane having a blade root end and a blade tip end twisted relative to said blade root end to thereby form a variable attack angle along its length;
    a magnet supported by said rim of said rotating frame and having an angular velocity approximately equal to or greater than the blade tip speed of said blades, said magnet being mounted to said rim of said rotating frame independent of said blades wherein the weight of said magnet is not borne by said blades and instead is borne by said rotating frame; and
    a conductive circuit, said circuit being sufficiently close to said magnet to induce current flow in said circuit when said magnet is moved by said circuit.

13. The wind turbine according to claim 12, wherein each of said flexible membranes having an inner side and an outer side, each outer side forming a windward facing side of a respective blade and said inner side forming a leeward side of said respective blade.

14. The wind turbine according to claim 12, wherein each of said turbine blades includes first and second outer edges, each of said first outer edges of a respective blade being secured along its length to and adjacent or at a respective arm wherein each respective blade is secured along its length to a respective arm and extends from one side of the respective arm.

15. The wind turbine according to claim 14, wherein each of said turbine blades is mounted to a respective an by couplers.

16. The wind turbine according to claim 15, wherein said couplers are elastic to allow the blades to deflect away from said arms.

17. The wind turbine according to claim 12, wherein the lateral extent of each respective blade root of each blade is less than the lateral extent of the respective blade tip.

18. The wind turbine according to claim 1, wherein each of said blades is mounted to a pair of arms.

19. The wind turbine according to claim 1, wherein each respective blade includes a longitudinal outer edge, one of said blade edges of each respective blade, being secured to a respective arm to support said respective blade along its length at said respective arm.

20. The wind turbine according to claim 2, wherein each side of said magnet projects outwardly from said rim in a direction generally parallel to said central axis of rotation.

21. The wind turbine according to claim 5, wherein each of said blades is mounted to a respective arm by a flexible coupler such that said blades can deflect away from said arms.

* * * * *